US012790122B2

(12) United States Patent
Liu

(10) Patent No.: US 12,790,122 B2
(45) Date of Patent: Nov. 10, 2026

(54) WAREHOUSING SYSTEM, CONTROL METHOD, ELECTRONIC DEVICE, AND STORAGE MEDIUM

(71) Applicant: SHENZHEN KUBO SOFTWARE CO., LTD, Shenzhen (CN)

(72) Inventor: Weiyin Liu, Shenzhen (CN)

(73) Assignee: SHENZHEN KUBO SOFTWARE CO., LTD, Shenzhen (CN)

( * ) Notice: Subject to any disclaimer, the term of this patent is extended or adjusted under 35 U.S.C. 154(b) by 184 days.

(21) Appl. No.: 18/977,804

(22) Filed: Dec. 11, 2024

(65) Prior Publication Data

US 2025/0115431 A1 Apr. 10, 2025

Related U.S. Application Data

(63) Continuation of application No. PCT/CN2023/107315, filed on Jul. 13, 2023.

(30) Foreign Application Priority Data

Jul. 19, 2022 (CN) ......................... 202210847837.4

(51) Int. Cl.
*B65G 1/137* (2006.01)
*B65G 1/04* (2006.01)
(Continued)

(52) U.S. Cl.
CPC ......... *B65G 1/1378* (2013.01); *B65G 1/0492* (2013.01); *B65G 1/10* (2013.01); *G06Q 10/087* (2013.01)

(58) Field of Classification Search
CPC ...... B65G 1/1378; B65G 1/0492; B65G 1/10; B65G 1/1373; B65G 1/04; G06Q 10/087; G06Q 10/08741
See application file for complete search history.

(56) References Cited

U.S. PATENT DOCUMENTS

2016/0132059 A1* 5/2016 Mason .................. B25J 9/1664 701/28
2017/0203920 A1 7/2017 Otto et al.
(Continued)

FOREIGN PATENT DOCUMENTS

CN 109160169 A 1/2019
CN 109592280 A 4/2019
(Continued)

OTHER PUBLICATIONS

International Search Report in International Application No. PCT/CN2023/107315, mailed Oct. 10, 2023, with English translation provided by WIPO.
(Continued)

*Primary Examiner* — Timothy R Waggoner
(74) *Attorney, Agent, or Firm* — Ladas & Parry, LLP

(57) ABSTRACT

This application embodiment relates to the field of intelligent warehousing technology, providing a warehousing system and its control method, device, electronic equipment, and storage medium. The warehousing system includes a storage area with multiple shelves for placing the first container, which is used for storing a first-type item that meet a preset standard. The bottom of the shelves forms a first space, with at least some shelves having a first space below for placing a second container, used for storing a second type item that do not meet a preset standard. The storage area also includes a first robot and a second robot, where the first robot is used for placing or taking out the first container on the shelves, and the second robot is used for storing and retrieving the second container in the first space.

20 Claims, 9 Drawing Sheets

(51) Int. Cl.
*B65G 1/10* (2006.01)
*G06Q 10/087* (2023.01)

(56) References Cited

U.S. PATENT DOCUMENTS

| | | | | |
|---|---|---|---|---|
| 2021/0395012 | A1* | 12/2021 | Liu | B65G 1/1371 |
| 2022/0002084 | A1* | 1/2022 | Chen | B65G 1/1373 |

FOREIGN PATENT DOCUMENTS

| | | | |
|---|---|---|---|
| CN | 209758194 | U | 12/2019 |
| CN | 110723448 | A | 1/2020 |
| CN | 110949923 | A | 4/2020 |
| CN | 111861325 | A | 10/2020 |
| CN | 112591359 | A | 4/2021 |
| CN | 113104470 | A | 7/2021 |
| CN | 113496327 | A | 10/2021 |
| CN | 215709060 | U | 2/2022 |
| CN | 216188184 | U | 4/2022 |
| CN | 216425638 | U | 5/2022 |
| CN | 115258507 | A | 11/2022 |
| CN | 217707361 | U | 11/2022 |

OTHER PUBLICATIONS

Written Opinion of the International Searching Authority in International Application No. PCT/CN2023/107315, mailed Oct. 10, 2023, with English translation provided by WIPO.

* cited by examiner

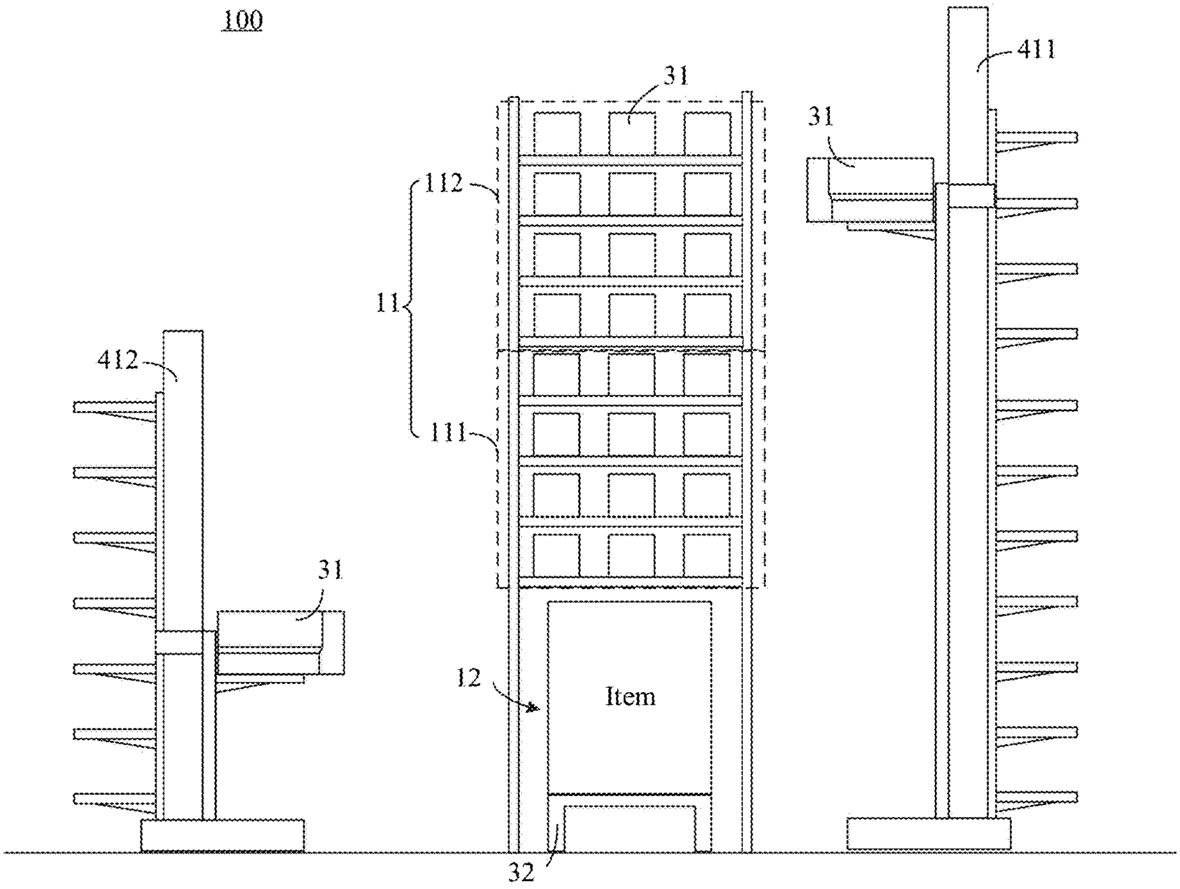

FIG. 6

S41

Determine, from a first container, a first sub-container storing a first-type item with a warehouse exit rate lower than a first threshold

S42

Determine a first sub-container that does not need to be outbound within preset time, and a first sub-container that needs to be outbound within the preset time

S43

Dispatch a high-reach robot to carry, from a first shelving unit to a second shelving unit, the first sub-container that does not need to be outbound within the preset time, and carry, from the second shelving unit to the first shelving unit, the first sub-container that needs to be outbound within the preset time

FIG. 7

WAREHOUSING SYSTEM, CONTROL METHOD, ELECTRONIC DEVICE, AND STORAGE MEDIUM

CROSS-REFERENCES

This application is a continuation of International Patent Application No. PCT/CN2023/107315 filed on Jul. 13, 2023, which claims priority to Chinese Patent Application No. 202210847837.4, filed with the China National Intellectual Property Administration on Jul. 19, 2022, and entitled "WAREHOUSING SYSTEM, CONTROL METHOD AND APPARATUS THEREOF, ELECTRONIC DEVICE, AND STORAGE MEDIUM", the disclosures of which are incorporated herein by reference in their entireties.

TECHNICAL FIELD

Embodiments of this application relate to the field of intelligent warehousing technologies, and specifically, to a warehousing system, a control method and apparatus thereof, an electronic device, and a storage medium.

BACKGROUND OF THE INVENTION

The emerging and development of e-commerce and online shopping as well as the increasing demand for automation in the manufacturing industry create development opportunities for intelligent goods warehousing logistics. In recent years, an intelligent warehousing system based on warehouse robots employs a dispatching system to dispatch the robots, to implement rapid outbound and inbound operations of goods. At present, in the existing warehousing system and a control scheme thereof, different items are stored in separate warehouses, or different items need to be placed in different storage areas of a same warehouse, and the storage methods in different storage areas may be different. For example, a manual warehouse and an automatic warehouse may be included. Workstations for handling different items are also different. Different items need to be carried to different workstations when the items are exiting a warehouse. Therefore, the warehouses exhibit low item compatibility, resulting in increased management and operating costs, cumbersome operation steps for orders requiring a plurality of types of items, and low operation efficiency.

SUMMARY OF THE INVENTION

In view of the above problems, embodiments of this application provide a warehousing system, a control method and apparatus thereof, an electronic device, and a storage medium, to resolve the problems of low item compatibility of warehouses and low operation efficiency in conventional technologies.

According to a first aspect in embodiments of this application, a warehousing system control method is provided, including:

determining a container type of a target container corresponding to a to-be-carried task, where the container type is a first container or a second container, the first container is used for storing a first-type item, the first-type item is an item with an attribute satisfying a preset standard, the second container is at least used for storing a second-type item, and the second-type item is an item with an attribute not satisfying the preset standard;

determining a position for storing the target container, where the position includes a shelving unit located in a storage area or a first space located at a bottom of the shelving unit, the first space is provided under at least a part of the shelving units, the shelving unit is used for placing the first container, and the first space is used for placing the second container;

determining, based on the container type, a target robot used for carrying the target container, where the target robot is a first robot or a second robot, the first robot is used for placing or taking out the first container on or from the shelving unit, and the second robot is used for placing or taking out the second container in or from the first space; and dispatching the target robot to place or take out the target container at or from the position to perform the to-be-carried task, and if a same order includes both the first-type item and the second-type item, controlling the first robot and the second robot that perform to-be-carried tasks corresponding to the same order to carry the first-type item and the second-type item respectively to a same workstation, or controlling the first robot to place the first container storing the first-type item on the second container, and controlling the second robot to carry the first-type item and the second-type item to a same workstation.

In some embodiments, the method further includes:

receiving at least two to-be-carried tasks, where the at least two to-be-carried tasks are to respectively carry at least two target items to at least two workstations;

determining, from the second containers storing the target items, a target second container that satisfies a requirement of at least a part of workstations for the target items;

determining a target position for storing the target second container; and dispatching the second robot to carry the target second container from the target position to the part of the at least two workstations in sequence.

In some embodiments, the determining, from the second containers storing the target items, a target second container that satisfies a requirement of at least a part of workstations for the target items includes:

acquiring the total quantity of target items of the at least two to-be-carried tasks; and determining, from the second containers storing the target items, the target second container in which the quantity of the target items is closest to and greater than or equal to the total quantity of the target items.

In some embodiments, the method further includes:

in response to receipt of a first to-be-carried task, dispatching the second robot to perform the first to-be-carried task, where the first to-be-carried task is to carry a target item to a first workstation, and the target item is stored in a target second container;

in response to receipt of a second to-be-carried task that is to carry the target item to a second workstation, determining whether the quantity of items stored in the target second container carried by the second robot satisfies a requirement for the quantity of items in the second to-be-carried task after the first to-be-carried task is completed; and if yes, dispatching the second robot to carry the target second container to the first workstation to complete the first to-be-carried task, and then continue to carry the target second container to the second workstation to complete the second to-be-carried task.

In some embodiments, the method further includes:

determining whether the second workstation is located within a preset range around the first workstation; and if the second workstation is not located within the preset range around the first workstation, skip performing the step of determining whether the quantity of items stored in the target second container carried by the second robot satisfies a requirement for the quantity of items in the second to-be-carried task after the first to-be-carried task is completed.

In some embodiments, the shelving unit includes a first shelving unit and a second shelving unit that are arranged along a height direction. In the height direction, the first shelving unit is adjacent to the first space, and the second shelving unit is located on the first shelving unit. The first robot includes a high-bay robot. The high-bay robot is used for accessing the first container placed on the second shelving unit.

The method further includes:

determining, from the first container, a first sub-container storing the first-type item with a warehouse exit rate lower than a first threshold;

determining the first sub-container that does not need to be outbound within preset time, and the first sub-container that needs to be outbound within the preset time; and dispatching the high-bay robot to carry, from the first shelving unit to the second shelving unit, the first sub-container that does not need to be outbound within the preset time, and carry, from the second shelving unit to the first shelving unit, the first sub-container that needs to be outbound within the preset time.

In some embodiments, the second container is further used for storing the first-type item.

The method further includes:

acquiring the total quantity of target items required by a target workstation corresponding to the to-be-carried task, where the target item is the first-type item;

determining whether the total quantity of the target items is greater than a preset threshold;

if yes, determining a target second container from the second containers storing the target items, where the quantity of the target items stored in the target second container is greater than the preset threshold; and dispatching the second robot to carry the target second container to the target workstation.

In some embodiments, the second container is further used for storing the first-type item.

The method further includes:

acquiring the quantity of first-type items stored in the second container; and determining whether the quantity of the first-type items is less than a second threshold, and if yes, sending an item transfer instruction for instructing to transfer an item in the second container to the first container; and/or determining whether the quantity of the first-type items is less than or equal to an item holding capacity of the first container, and if yes, sending an item transfer instruction for instructing to transfer an item in the second container to the first container.

In some embodiments, a second space is formed at a bottom of the second container, and a height of the second space is higher than a height of the second robot.

The method further includes:

in response to the second container being not loaded on the second robot, dispatching the second robot to pass through the second space.

In some embodiments, the method further includes:

determining a dynamic adjustment plan for the first space based on an item storage requirement, where the dynamic adjustment plan includes providing the first space at a bottom of a first shelving unit which is not provided with the first space and canceling the first space at a bottom of a second shelving unit which is provided with the first space.

According to a second aspect in embodiments of this application, a warehousing system control apparatus is provided, including:

an acquisition module, configured to determine a container type of a target container corresponding to a to-be-carried task, where the container type includes a first container and a second container, the first container is used for storing a first-type item, the first-type item is an item with an attribute satisfying a preset standard, the second container is at least used for storing a second-type item, and the second-type item is an item with an attribute not satisfying the preset standard;

a first determining module, configured to determine a position for storing the target container, where the position includes a shelving unit located in a storage area or a first space located at a bottom of the shelving unit, the first space is provided under at least a part of the shelving units, the shelving unit is used for placing the first container, and the first space is used for placing the second container;

a second determining module, configured to determine, based on the container type, a target robot used for carrying the target container, where the target robot is a first robot or a second robot, the first robot is used for placing or taking out the first container on or from the shelving unit, and the second robot is used for placing or taking out the second container in or from the first space; and a dispatch module, configured to dispatch the target robot to place or take out the target container at or from the position to perform the to-be-carried task, and if a same order includes both the first-type item and the second-type item, control the first robot and the second robot that perform to-be-carried tasks corresponding to the same order to carry the first-type item and the second-type item respectively to a same workstation, or control the first robot to place the first container storing the first-type item on the second container, and control the second robot to carry the first-type item and the second-type item to a same workstation.

According to a third aspect of embodiments of this application, an electronic device is provided, including a processor, a memory, a communication interface, and a communication bus. The processor, the memory, and the communication interface communicate with each other via the communication bus.

The memory is configured to store at least one executable instruction. The executable instruction enables the processor to perform the operations of the foregoing warehousing system control method.

According to a fourth aspect of embodiments of this application, a computer-readable storage medium is provided. The storage medium stores at least one executable instruction. When the executable instruction is run on an electronic device, the electronic device is enabled to perform the operations of the foregoing warehousing system control method.

According to a fifth aspect of embodiments of this application, a computer program product is provided, including a computer program. The computer program, when executed by a processor, performs the operations of the foregoing warehousing system control method.

According to a sixth aspect of embodiments of this application, a warehousing system is provided, including a storage area. A plurality of shelving units are provided in the storage area. The shelving unit is used for placing a first container. The first container is used for storing a first-type item, and the first-type item is an item with an attribute satisfying a preset standard.

A first space is formed at a bottom of at least a part of the shelving units. The first space is used for placing a second container. The second container is at least used for storing a second-type item. The second-type item is an item with an attribute not satisfying the preset standard.

A first robot and a second robot are further provided in the storage area. The first robot is used for placing or taking out the first container on or from the shelving unit. The second robot is used for placing or taking out the second container in or from the first space.

The warehousing system further includes a control apparatus, and the control apparatus is configured to:

determine a container type of a target container corresponding to a to-be-carried task, where the container type is the first container or the second container;

determine a position for storing the target container;

determine, based on the container type, a target robot used for carrying the target container, where the target robot is the first robot or the second robot; and dispatch the target robot to place or take out the target container at or from the position to perform the to-be-carried task, and if a same order includes both the first-type item and the second-type item, control the first robot and the second robot that perform to-be-carried tasks corresponding to the same order to carry the first-type item and the second-type item respectively to a same workstation, or control the first robot to place the first container storing the first-type item on the second container, and control the second robot to carry the first-type item and the second-type item to a same workstation.

In some embodiments, the warehousing system further includes a plurality of workstations; and the control apparatus is further configured to:

receive at least two to-be-carried tasks, where the at least two to-be-carried tasks are to respectively carry at least two target items to at least two workstations;

determine, from the second containers storing the target items, a target second container that satisfies a requirement of at least a part of workstations for the target items;

determine a target position for storing the target second container; and dispatch the second robot to carry the target second container from the target position to the part of the at least two workstations in sequence.

In some embodiments, the control apparatus being configured to determine, from the second containers storing the target items, a target second container that satisfies a requirement of at least a part of workstations for the target items includes:

acquiring the total quantity of target items of the at least two to-be-carried tasks; and determining, from the second containers storing the target items, the target second container in which the quantity of the target items is closest to and greater than or equal to the total quantity of the target items.

In some embodiments, the warehousing system includes at least a first workstation and a second workstation; and the control apparatus is further configured to:

in response to receipt of a first to-be-carried task, dispatch the second robot to perform the first to-be-carried task, where the first to-be-carried task is to carry a target item to the first workstation, and the target item is stored in a target second container;

in response to receipt of a second to-be-carried task that is to carry the target item to the second workstation, determine whether the quantity of items stored in the target second container carried by the second robot satisfies a requirement for the quantity of items in the second to-be-carried task after the first to-be-carried task is completed; and if yes, dispatch the second robot to carry the target second container to the first workstation to complete the first to-be-carried task, and then continue to carry the target second container to the second workstation to complete the second to-be-carried task.

In some embodiments, the control apparatus is further configured to:

determine whether the second workstation is located within a preset range around the first workstation; and if the second workstation is not located within the preset range around the first workstation, skip performing the step of determining whether the quantity of items stored in the target second container carried by the second robot satisfies a requirement for the quantity of items in the second to-be-carried task after the first to-be-carried task is completed.

In some embodiments, the shelving unit includes a first shelving unit and a second shelving unit that are arranged along a height direction. In the height direction, the first shelving unit is adjacent to the first space, and the second shelving unit is located on the first shelving unit.

The first container includes a first sub-container used for storing the first-type item with a warehouse exit rate lower than a first threshold.

The first robot includes a high-bay robot. The high-bay robot is used for accessing the first container placed on the second shelving unit.

The control apparatus is further configured to:

determine, from the first container, a first sub-container storing the first-type item with a warehouse exit rate lower than a first threshold;

determine the first sub-container that does not need to be outbound within preset time, and the first sub-container that needs to be outbound within the preset time; and dispatch the high-bay robot to carry, from the first shelving unit to the second shelving unit, the first sub-container that does not need to be outbound within the preset time, and carry, from the second shelving unit to the first shelving unit, the first sub-container that needs to be outbound within the preset time.

In some embodiments, the warehousing system further includes a plurality of workstations, and the second container is further used for storing the first-type item.

The control apparatus is further configured to:

acquire the total quantity of target items required by a target workstation corresponding to the to-be-carried task, where the target item is the first-type item;

determine whether the total quantity of the target items is greater than a preset threshold;

if yes, determine a target second container from the second containers storing the target items, where the quantity of the target items stored in the target second container is greater than the preset threshold; and dispatch the second robot to carry the target second container to the target workstation.

In some embodiments, the second container is further used for storing the first-type item.

The control apparatus is further configured to:

acquire the quantity of first-type items stored in the second container; and determine whether the quantity of the first-type items is less than a second threshold, and if yes, send an item transfer instruction for instructing to transfer an item in the second container to the first container; and/or determine whether the quantity of the first-type items is less than or equal to an item holding capacity of the first container, and if yes, send an item transfer instruction for instructing to transfer an item in the second container to the first container.

In some embodiments, a second space is formed at a bottom of the second container, and a height of the second space is higher than a height of the second robot.

The control apparatus is further configured to:

in response to the second container being not loaded on the second robot, dispatch the second robot to pass through the second space.

In some embodiments, the control apparatus is further configured to:

determine a dynamic adjustment plan for the first space based on an item storage requirement, where the dynamic adjustment plan includes providing the first space at a bottom of a first shelving unit which is not provided with the first space and canceling the first space at a bottom of a second shelving unit which is provided with the first space.

In some embodiments, the workstation is provided with at least two working positions, and the working position is used for an inbound operation, an outbound operation, or a picking operation on different types of containers or items.

In embodiments of this application, the shelving unit in the storage area is configured to allow for placement of the first container for storing the first-type item. The first space for placing the second container is provided at the bottom of the shelving unit, and the second container at least for storing the second-type item may be placed in the first space. The first-type item is an item with an attribute satisfying the preset standard. The second-type item is an item with an attribute not satisfying the preset standard. The first container and the second container are carried by different robots, respectively. In this way, the first-type item and the second-type item are stored in one storage area, and carrying of different types of items in the same storage area is controlled by using one system, so that storage compatibility of items is improved, costs are reduced, and carrying efficiency is improved. In addition, when the same order requires different types of items, the required items can be carried from one storage area without secondary confluence, so that carrying efficiency is further improved, and costs are reduced.

The foregoing description is only an overview of the technical solutions of embodiments of this application. To understand technical means of embodiments of this application more clearly, the technical means can be implemented according to contents of this specification. In addition, to make the foregoing and other purposes, features, and advantages of embodiments of this application clearer and easier to understand, specific implementations of this application are described below.

BRIEF DESCRIPTION OF DRAWINGS

The accompanying drawings are merely used for illustrating the implementations and are not intended to constitute a limitation on this application. Throughout the accompanying drawings, the same reference numerals are used to represent the same components. In the accompanying drawings:

FIG. 6 is a schematic side view of a warehousing system according to an embodiment of this application;

FIG. 7 is a flowchart of a method performed by a control apparatus according to an embodiment of this application;

REFERENCE NUMERALS ARE AS FOLLOWS

Figure 1:
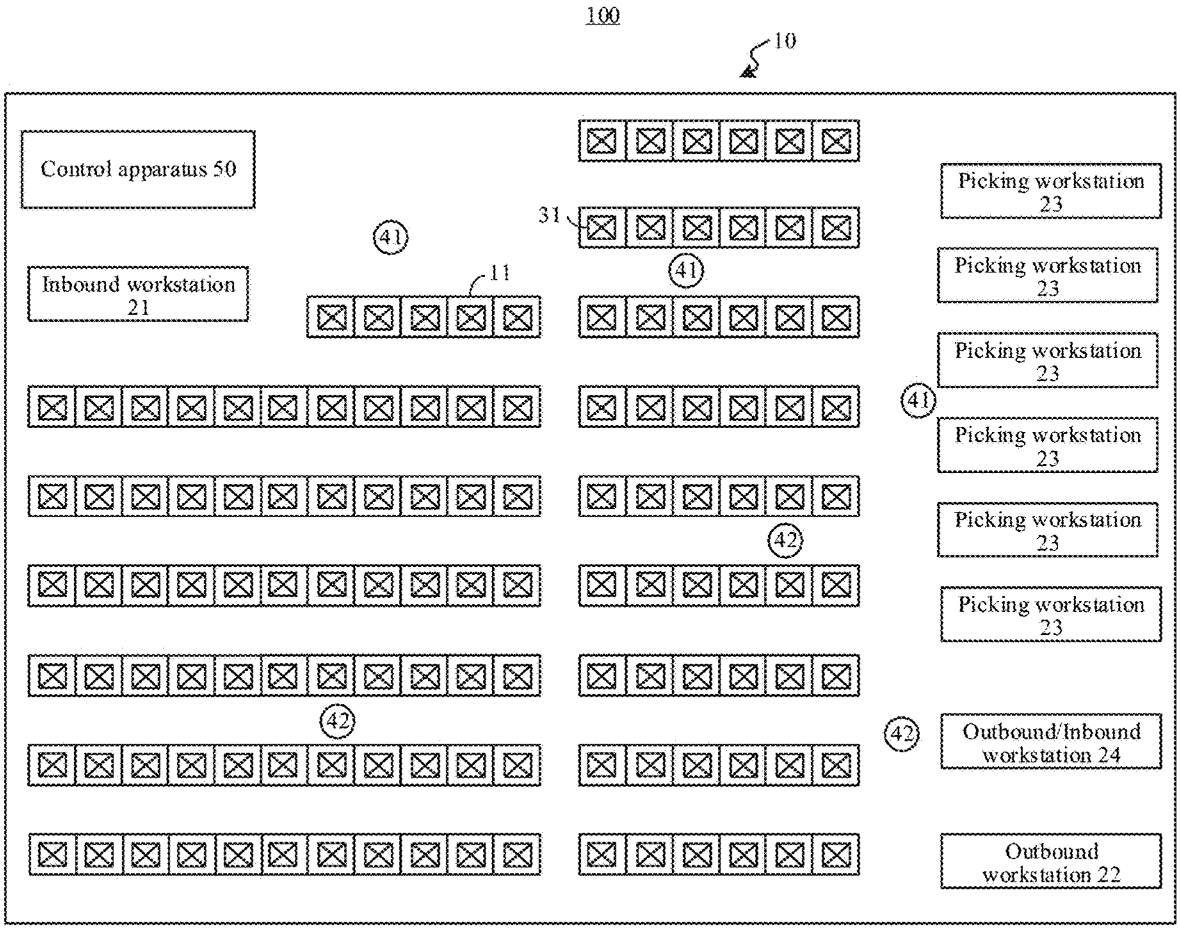
FIG. 1 is a schematic top-view planar diagram of a warehousing system according to an embodiment of this application.

100. warehousing system;

10. storage area;

21. inbound workstation; 22. outbound workstation; 23. picking workstation; 24. inbound or outbound workstation;

11. shelving unit; 111. first shelving unit; 112. second shelving unit; 12. first space; 13. second space;

31. first container; 32. second container;

41. first robot; 42. second robot; 41*a*. high-bay robot; 41*b*. middle- and low-bay robot;

411. mobile chassis; 412. post; 413. carrying apparatus; 414. storage shelf; 421. driving mechanism; 422. lifting mechanism;

50. control apparatus;

$h_1$. height of a first space at a bottom of a shelving unit; $h_2$. overall height of a second container when accommodating a second-type item; $h_3$. overall height of a second robot when carrying a second container; $h_4$. height of a second space; $h_5$. height of a second robot.

DETAILED DESCRIPTION

Example embodiments of this application are described in more detail in the following with reference to the accompanying drawings. Although example embodiments of this application are shown in the accompanying drawings, it should be understood that this application can be implemented in various forms, and should not be construed as being limited to embodiments described herein.

The emerging and development of e-commerce and online shopping as well as the increasing demand for automation in the manufacturing industry create development opportunities for intelligent goods warehousing logistics. In recent years, an intelligent warehousing system based on warehouse robots employs a dispatching system to dispatch the robots, to implement rapid outbound and inbound operations of goods.

At present, the existing warehousing system and a control scheme thereof allow items of one type only to be stored in each warehouse, but do not allow a plurality of types of items to be stored in one single warehouse. It should be noted that the types of items described with "one type" and "a plurality of types" are classified based on volumes, shapes, weights, quantities, or packing manners of the items, rather than types of stock keeping units (stock Keeping Units, SKUs). When the warehousing system needs to store a plurality of types of items, the plurality of types of items need to be stored separately in a plurality of warehouses, resulting in increased management and operation costs. In addition, when an order includes items in different warehouses, the items stored in the warehouses need to be respectively carried from different warehouses first, respectively picked, and then perform secondary confluence. The operation steps are cumbersome. As a result, the efficiency is low, and a lot of manpower is also required, which further cause increased costs.

For the foregoing problems, this application provides a warehousing system and a control method thereof. The shelving unit in the storage area is configured to allow for placement of the first container for storing the first-type item. The first space for placing the second container is provided at the bottom of the shelving unit, and the second container at least for storing the second-type item may be placed in the first space. The first-type item is an item with an attribute satisfying the preset standard. The second-type item is an item with an attribute not satisfying the preset standard. The first container and the second container are carried by different robots, respectively. In this way, the first-type item and the second-type item are stored in one storage area, and carrying of different types of items in the same storage area is controlled by using one system, so that storage compatibility of items is improved, costs are reduced, and carrying efficiency is improved. In addition, when the same order requires different types of items, the required items can be carried from one storage area without secondary confluence, so that carrying efficiency is further improved, and costs are reduced.

The warehousing system in embodiments of this application is first described below. Unless otherwise specified, the term "a plurality of" in the following indicates at least two.

Figure 2:
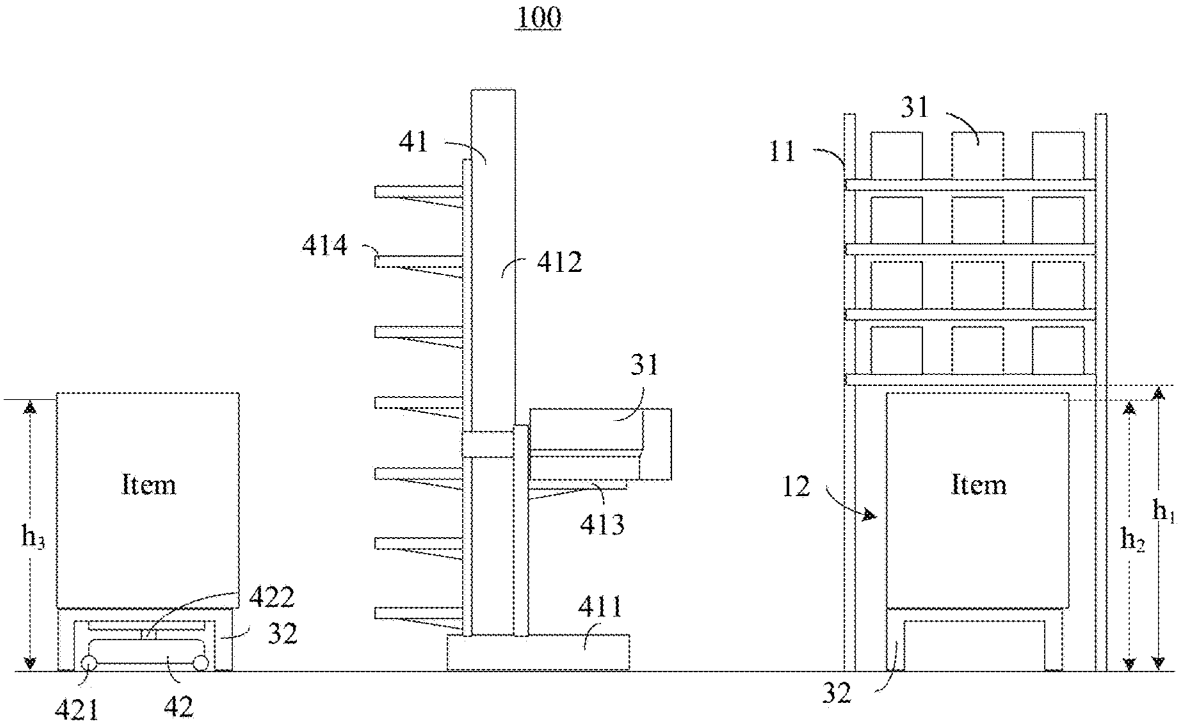
FIG. 2 is a schematic side view of a warehousing system according to an embodiment of this application.

FIG. 1 is a schematic top-view planar diagram of a warehousing system according to an embodiment of this application. FIG. 2 is a schematic side view of a warehousing system according to an embodiment of this application. As shown in FIG. 1 and FIG. 2, the warehousing system 100 includes a storage area 10 and workstations (21, 22, 23, and 24). The warehousing system 100 of this embodiment may be provided in a warehouse. The storage area 10 is a partial area of the warehouse. The workstation may include an inbound workstation 21, an outbound workstation 22, and a picking workstation 23. A person skilled in the art should understand that the workstations mentioned above may be workstations with only one function, or may be workstations with two or three functions, such as an inbound/outbound workstation 24.

A plurality of shelving units 11 are provided in the storage area 10. The shelving unit 11 is used for placing a first container 31. The first container 31 is used for storing a first-type item. The first-type item is an item with an attribute satisfying a preset standard. A first space 12 is formed at a bottom of at least a part of the shelving units 11. The first space 12 is used for placing a second container 32. The second container 32 is at least used for storing a second-type item. The second-type item is an item with an attribute not satisfying the preset standard. In a scenario in which the quantity of second containers 32 to be stored is not large, the first space 12 is only formed at the bottom of a part of the shelving units 11, and the bottom of remaining shelving units 11 may be configured to store the first containers 31, so that the utilization of the warehousing system can be improved.

In this embodiment of this application, a preset standard suitable for containers is set for items. Items are classified based on the preset standard, and the items are respectively stored in suitable containers based on the classification. The attribute includes volume, weight, quantity, shape, packing manner, and/or the like. The preset standard is: the volume and/or the weight and/or the quantity is/are less than or equal to corresponding preset threshold/corresponding preset thresholds (the term "corresponding" indicates that each attribute has a preset threshold defined, such as a preset volume threshold, a preset weight threshold, or a preset quantity threshold), and/or the shape is a preset specified shape, and/or the packing manner is not a preset packing manner. An item that satisfies the preset standard may be accommodated by the first container 31. An item that does not satisfy the preset standard cannot be accommodated by the first container 31, or if the item is accommodated by the first container 31, space of the first container 31 cannot be fully utilized, resulting in a reduction in the quantity of items accommodated in the first container 31, and inconvenience for subsequent items picking. Therefore, the item that does not satisfy the preset standard is accommodated by the second container 32. When there are a plurality of attributes, generally, an item can be accommodated by the first container 31 only if each of its attributes satisfies the preset standard.

The preset specified shape may be a cuboid shape, a cylinder shape, or the like. The item that is not in the preset specified shape may be referred to as a special-shaped item (or a loose item). In addition, the special-shaped item may alternatively be, but is not limited to, an item with a volume larger than the preset volume threshold. When a volume of the special-shaped item is smaller than or equal to the preset threshold, the space of the first container 31 cannot be fully utilized because of the special-shaped item. Only a few special-shaped items can be accommodated in one single first container 31, which cause inconvenience for subsequent picking. The preset packing manner includes a packing manner that requires secondary transfer, such as packing with a carton. Because a carton is easily deformed and cannot be precisely placed or taken out by a robot dedicated to carrying the first container 31. Therefore, when the packing manner of an item is packing with a carton, if the item is stored by using the first container 31, during an inbound operation, the carton needs to be unpacked, that is, the carton needs to be opened to place the item into the first container 31 for the inbound operation. The secondary transfer of the item makes the operation cumbersome, resulting in low inbound efficiency. If the second container is used for storage, the carton can be directly put into storage and stored in the second container 32 without the need of a secondary transfer operation. Therefore, if the packing manner is not the foregoing preset packing manner, the item can be stored in the first container 31, otherwise the item needs to be stored in the second container 32.

In conclusion, in an actual application scenario, a special-shaped item, a large-sized item, an overweight item, an oversize item, a bulk inbound or outbound item (such as a packed large commodity), a carton, and the like are usually stored in the second container 32, and other small items are stored in the first container 31. The small items are usually items to be picked (for example, the first-type items include a plurality of types of items that are stored in different containers, and in a specific order, items required for the order needs to be picked from a plurality of types of items).

The first container 31 and the second container 32 represent container types. The first container 31 has a smaller capacity and size than the second container 32. The first container 31 is suitable for storing the first-type item. The second container 32 is suitable for storing the second-type item. The foregoing preset thresholds of the volume, weight, and quantity may be set based on the first container 31. For example, the preset volume threshold may be set based on a size of accommodation space of the first container 31. The preset volume threshold is set as a volume capacity of the first container 31. The first container 31 cannot accommodate an item with a volume larger than the preset volume threshold. Alternatively, the preset volume threshold may be set based on the minimum planned quantity of items to be accommodated in the first container 31 and a size of accommodation space of the first container 31. The preset volume threshold may be set as the volume capacity of the first container 31 or the minimum planned quantity of items to be accommodated. If the volume of an item is greater than the preset volume threshold, the first container 31 cannot accommodate the minimum planned quantity of items. For another example, the preset weight threshold may be set based on the load-bearing capacity of the first container 31. The preset weight threshold may be set as the maximum load-bearing weight of the first container 31, or to be slightly less than the maximum load-bearing weight of the first container 31. Alternatively, similar to the preset volume threshold, the preset weight threshold is set based on the minimum planned quantity of items to be accommodated in the first container 31 and the maximum load-bearing weight of the first container 31. The preset quantity threshold may be set based on the minimum planned quantity of items to be accommodated in the first container 31. The minimum planned quantity of items to be accommodated may be set, based on experience, as a quantity that facilitates a picking operation.

An item with a volume, a shape, a weight, or a quantity greater than a preset threshold cannot be accommodated by the first container 31, and such item is stored in a second container 32 with a larger size. Certainly, the second container 32 can be used not only for storing the second-type item, but also for storing the first-type item. The second container 32 can also be used for storing an item with a warehouse exit rate higher than a preset warehouse exit frequency. Because the second container 32 is placed in the first space 12, and the first space 12 is provided at the bottom of the shelving unit 11, that is, located on the ground, to facilitate carrying of items with a high warehouse exit frequency, thereby improving carrying efficiency. The preset warehouse exit frequency may be set by a person skilled in the art as needed, for example, twice a day, once a day, or once every two days.

A first robot 41 and a second robot 42 are further provided in the storage area 10. One or more first robots 41 and second robots 42 may be provided. The first robot 41 is used for placing or taking out the first container 31 on or from the shelving unit 11. The second robot 42 is used for placing or taking out the second container 32 in or from the first space 12. The warehousing system 100 also includes a control apparatus 50, configured to dispatch the first robot 41 and/or the second robot 42 to perform a to-be-carried task. For convenience of illustration, only one shelving unit, one first robot 41, and one second robot 42 are shown in FIG. 2. Both the first robot 41 and the second robot 42 are carrying containers. A robot can carry a to-be-stored item from the inbound workstation 21 to the shelving unit 11 or the first space 12, carry a to-be-delivered item from the shelving unit 11 or the first space 12 to the outbound workstation 22, or carry a to-be-picked item from the shelving unit 11 or the first space 12 to the picking workstation 23.

The first container 31 may be a container with limited volume and limited load, such as a bin, and a corresponding first robot 41 is a bin robot. Refer to FIG. 2. The bin robot includes a mobile chassis 411, posts 412, and a carrying apparatus 413 that is arranged on the posts 412 and is vertically movable along the posts 412. The carrying apparatus 413 is configured to carry the bin. Optionally, the bin robot may further include storage shelves 414 disposed on the side of the posts 412 opposite to the carrying apparatus 413. The storage shelves 414 can temporarily store a bin. The carrying apparatus 413 may place or take out the bin on or from the storage shelves 414.

The second container 32 may be a pallet, a rack, a cage trolley, a movable shelving unit, or another container with a large volume and a large load capacity. A corresponding second robot 42 is an autonomous mobile robot. The autonomous mobile robot includes a driving mechanism 421 and a lifting mechanism 422. The driving mechanism 421 may drive the autonomous mobile robot to move. The lifting mechanism 422 is configured to carry the second container 32. When the lifting mechanism 422 moves upward, the second container 32 can be lifted from the ground. When the lifting mechanism 422 is lowered, the second container 32 can be placed on the ground to carry the second container 32 and items placed on the second container 32 together.

Passages are provided between the shelving units 11, between the shelving units 11 and the workstations, and/or between the workstations to allow robots or workers to pass. Both the first robot 41 and the second robot 42 can be automatically guided robots. The first robot 41 and the second robot 42 can share the passages and implement positioning by identifying guide lines or two-dimensional codes on the ground, so as to implement movement within the warehousing system 100.

In a height direction, a height $h_1$ of the first space 12 at a bottom of the shelving unit 11 needs to be higher than an overall height $h_2$ of the second container 32 when accommodating the second-type item, so that the first space 12 can accommodate the second container 32. Furthermore, the height $h_1$ of the first space 12 at the bottom of the shelving unit 11 needs to be higher than the overall height $h_3$ of the second robot 42 when carrying the second container 32, so that the second robot 42 can carry the second container 32 to the first space 12.

Figure 3:
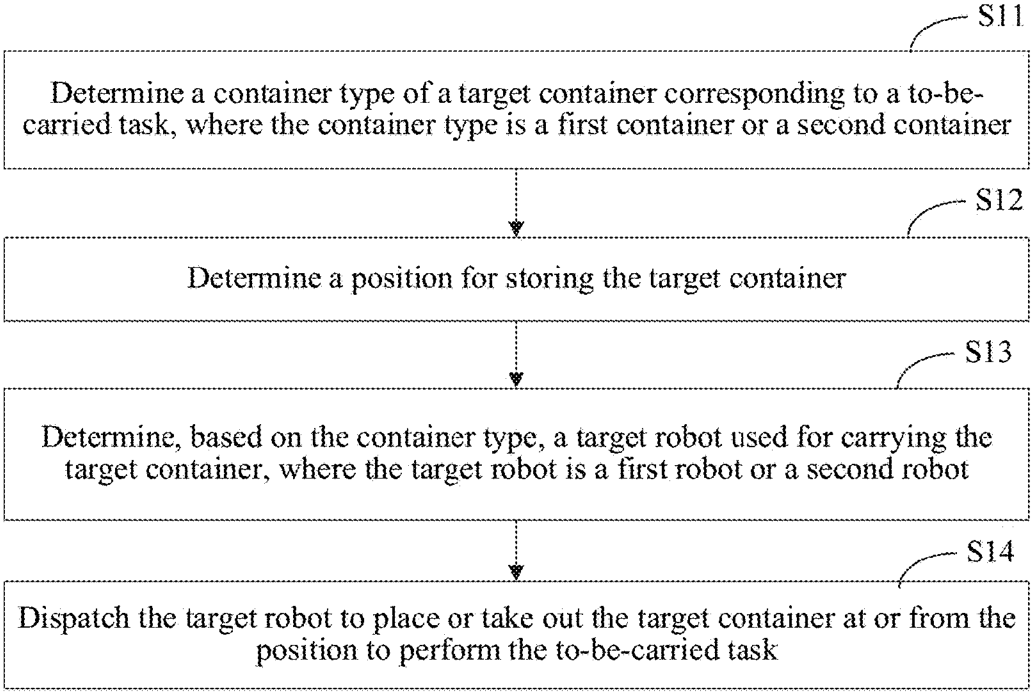
FIG. 3 is a flowchart of a method performed by a control apparatus according to an embodiment of this application.

The following describes a process of the control apparatus dispatching the first robot and/or the second robot to perform the to-be-carried task. FIG. 3 is a flowchart of a method performed by a control apparatus according to an embodiment of this application. As shown in FIG. 3, the control apparatus is configured to perform the following steps.

Step S11: Determine a container type of a target container corresponding to a-to-be-carried task, where the container type is a first container or a second container.

The control apparatus receives the to-be-carried task. The to-be-carried task may be to carry a target item from a workstation to a storage area (hereinafter referred to as an inbound task), or to carry the target item from the storage area to a workstation (hereinafter referred to as an outbound task or a picking task). For the inbound task, the container type of the target container corresponding to the to-be-carried task is determined based on a target container actually located at the workstation. In other words, the container type is determined and does not need to be selected by the control apparatus. For the outbound task, the container type of the target container corresponding to the to-be-carried task is not necessarily determined. The to-be-carried task may include only target item information. The control apparatus needs to determine the container type of the target container based on the target item information. All containers storing the target item can be used as candidate containers. The control apparatus selects a specific type of container from the candidate containers as the container type of the target container.

Step S12: Determine a position for storing the target container.

For the inbound task, the control apparatus may directly determine the position based on the to-be-carried task. In other words, the position may be directly determined based on a workstation indicated by the to-be-carried task. For the outbound task, after the control apparatus determines the container type of the target container, a specific target container may be determined from containers of this type in the storage area. To be specific, one or a plurality of containers of this type are selected from a large quantity of containers of this type as a target container or target containers to be carried at this time. Then, a position of the target container in the storage area is further determined. During determining a specific target container from containers of this type in the storage area, the specific target container can be selected based on a preset condition. For example, the preset condition is that the container is closest to a target workstation position, or there is an idle robot within a shortest distance around the container, or the container is closest to the target robot determined in step S13. Selection of the target container in such way facilitates improving carrying efficiency.

Step S13: Determine, based on the container type, a target robot used for carrying the target container, where the target robot is the first robot or the second robot.

If the container type is the first container, the target robot is the first robot. If the container type is the second container, the target robot is the second robot.

There is no data correlation between step S12 and step S13. The execution order of step S12 and step S13 is not limited in embodiments of this application. Step S12 may be performed before step S13. Alternatively, step S13 may be performed before step S12. Alternatively, step S12 and step S13 are performed simultaneously.

Step S14: Dispatch the target robot to place or take out the target container at or from the position to perform the to-be-carried task.

In step S14, if a same order includes both the first-type item and the second-type item, the first robot and the second robot that perform to-be-carried tasks corresponding to the same order are controlled to carry the first-type item and the second-type item respectively to a same workstation, or the first robot is controlled to place the first container storing the first-type item on the second container, and the second robot is controlled to carry the first-type item and the second-type item to a same workstation.

The same order may be a single order or a combined order including a plurality of orders. Target workstations for the same order are the same. When the same order includes both the first-type item and the second-type item, the first-type item may be carried to the target workstation by the first robot, and the second-type item may be carried to the target workstation by the second robot, to complete picking or outbound. The first robot may alternatively place the storage container of the first-type item on the second container, and the second robot carry all items to the target workstation together. The use of the second robot to carry all the items can improve robot utilization, reduce costs, and reduce the quantity of paths planned, thereby facilitating path planning. Two types of robots can be controlled to perform carrying in scenarios in which the robots have sufficient transport capacity and/or paths in a current warehousing system are not excessively crowded.

When the same workstation needs to handle different types of containers or items, for example, the same workstation needs to handle both inbound/outbound or picking of the first-type item, and inbound/outbound or picking of the second-type item, the workstation may be provided with at least two working positions, and different working positions are used for an inbound operation, an outbound operation, or a picking operation on different types of containers or items. During outbound of items, different items may be carried to the same workstation without needing to be carried to different workstations, respectively. In this way, compatibility of the warehousing system to the outbound or picking of items is improved, thereby improving the outbound or picking efficiency of the warehousing system.

In embodiments of this application, the shelving unit in the storage area is configured to allow for placement of the first container for storing the first-type item. The first space for placing the second container is provided at the bottom of at least a part of the shelving unit, and the second container at least for storing the second-type item may be placed in the first space. The first-type item is an item with an attribute satisfying the preset standard. The second-type item is an item with an attribute not satisfying the preset standard. The first container and the second container are carried by different robots, respectively. In this way, the first-type item and the second-type item are stored in one storage area, and carrying of different types of items in the same storage area is controlled by using one system, so that storage compatibility of items is improved, costs are reduced, and carrying efficiency is improved. In addition, when the same order requires different types of items, the required items can be carried from one storage area without secondary confluence, so that carrying efficiency is further improved, and costs are reduced.

Figure 4:
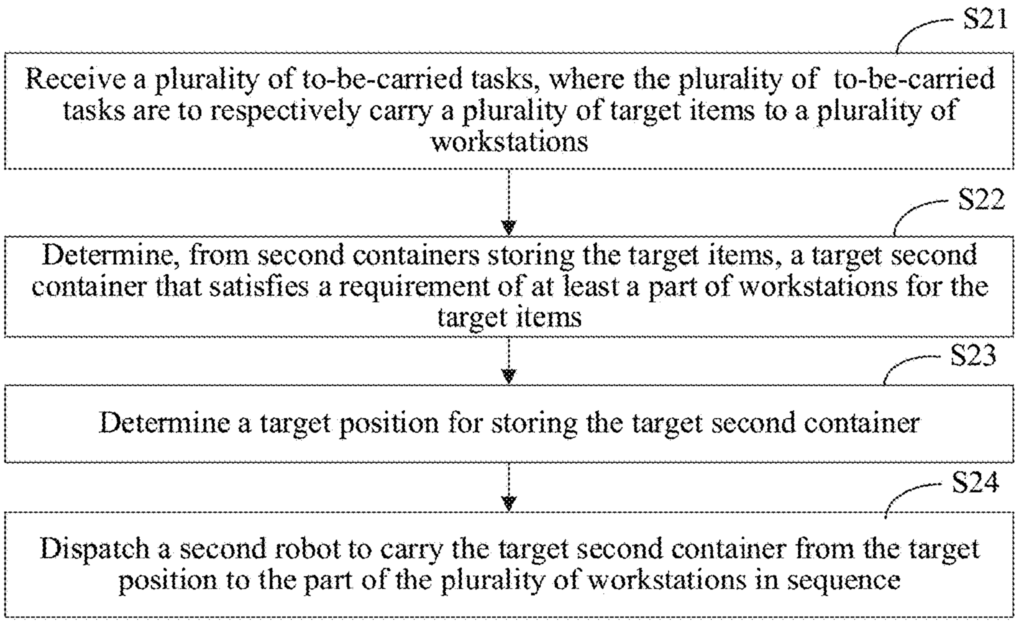
FIG. 4 is a flowchart of a method performed by a control apparatus according to an embodiment of this application.

Because the second container is large in size and may store many items, when there are to-be-carried tasks to a plurality of workstations, the second robot can be used to carry the second container to different workstations in sequence that require the target items, thereby implementing cross-workstation transportation of the second container. In some embodiments, as shown in FIG. 4, the control apparatus is further configured to perform the following steps.

Step S21: Receive at least two to-be-carried tasks, where the at least two to-be-carried tasks are to respectively carry at least two target items to at least two workstations.

For example, a first to-be-carried task is to carry the first quantity of target items to a first workstation, and a second to-be-carried task is to carry the second quantity of target items to a second workstation, . . . , and target items required by different workstations may be the same or different. For the convenience of description, an example in which the target items required by the workstations are the same is used for description in the following.

Step S22: Determine, from the second containers storing the target items, a target second container that satisfies a requirement of at least a part of workstations for the target items.

The target items are stored in a plurality of second containers. It is possible that not every second container stores sufficient target items to meet the requirement of the to-be-carried task. In this step, a container satisfying a requirement of at least a part of workstations for the target items is selected from a plurality of second containers as a target second container.

The "satisfying a requirement of at least a part of workstations for the target items" also includes satisfying a requirement, for the target items, of all workstations corresponding to all current to-be-carried tasks. If there is such a second container that can satisfy task requirements of all workstations, the second container is preferentially selected as the target second container. If there is no such second container, a second container that can satisfy requirements of more workstations is selected. In this way, the target second container carried can satisfy requirements of as many workstations for the target items as possible, so that the quantity of containers that needs to be carried is reduced, and carrying efficiency is improved.

In step S22, specifically, the total quantity of target items of at least two to-be-carried tasks may be acquired first, and then the target second container in which the quantity of the target items is closest to and greater than or equal to the total quantity of the target items is determined from the second containers storing the target items. In this way, the target second container can satisfy the requirements of all workstations for the target items, and the quantity of the target items stored in the target second container is closest to the total quantity of the target items, so that waste and unnecessary costs caused by unnecessary transportation is avoided as much as possible.

Step S23: Determine a target position for storing the target second container.

Step S24: Dispatch a second robot to carry the target second container from the target position to the part of the at least two workstations in sequence.

During transportation, an optimal movement path may be planned for the second robot. For example, the second container is first carried to a first workstation closest to the second container, and then is carried to a second workstation closest to the first workstation, . . . , thereby improving carrying efficiency.

According to the foregoing implementation, successive cross-workstation transportation of the second container can be implemented until the requirements of all workstations within a period of time is satisfied or remaining target items in the second container are insufficient to satisfy the requirement of any workstation. In this way, when a plurality of to-be-carried tasks for carrying target items stored in the second container are received, there is no need to carry a specific second container to a specific workstation and then continue to move another second container from the storage area to another workstation. Therefore, carrying efficiency is further improved.

Figure 5:
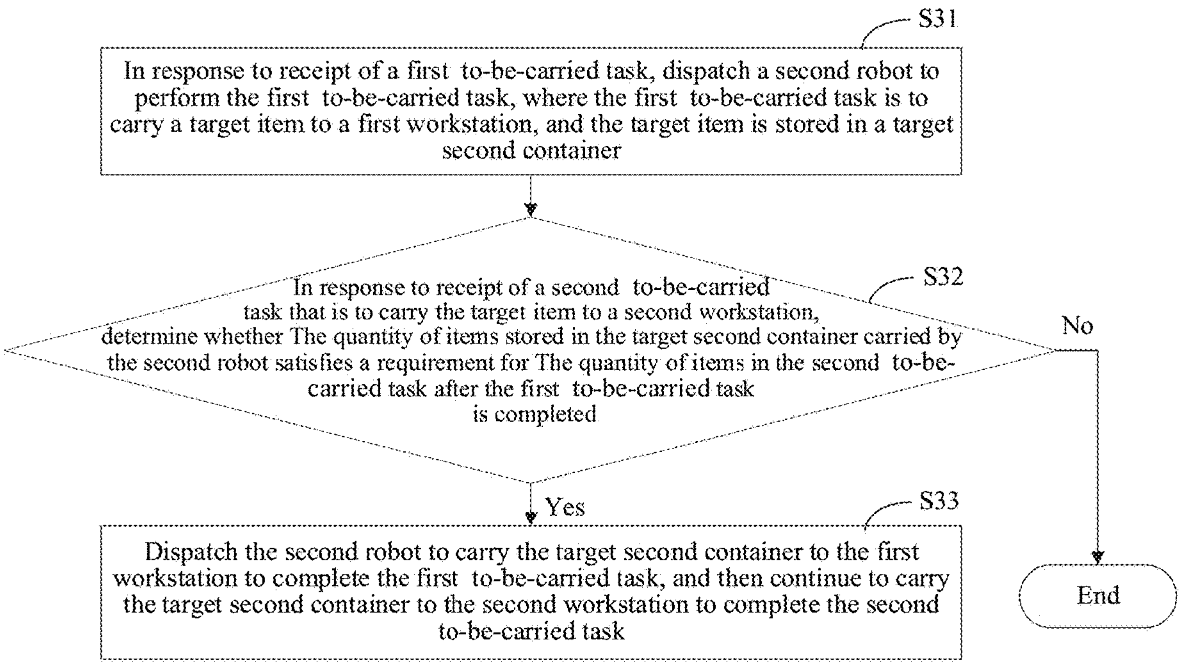
FIG. 5 is a flowchart of a method performed by a control apparatus according to an embodiment of this application.

When the second robot performs the to-be-carried task, if the control apparatus receives a new to-be-carried task, the to-be-carried task may be performed by the second robot that is currently performing a task. If required target items are the same as the target items stored in the second container carried by the second robot, a method similar to the foregoing cross-workstation transportation may also be performed. In some embodiments, as shown in FIG. 5, the control apparatus is further configured to perform the following steps.

Step S31: In response to receipt of a first to-be-carried task, dispatch the second robot to perform the first to-be-carried task, where the first to-be-carried task is to carry a target item to a first workstation, and the target item is stored in a target second container.

Step S32: In response to receipt of a second to-be-carried task that is to carry the target item to a second workstation, determine whether the quantity of items stored in the target second container carried by the second robot satisfies a requirement for the quantity of items in the second to-be-carried task after the first to-be-carried task is completed, and if yes, perform step S33, otherwise, end the process.

When the second to-be-carried task is received, the second robot may not have completed the first to-be-carried task, for example, is on the way to the first workstation, or may have completed the first to-be-carried task, for example, is to leave or has already leave the first workstation. If the second robot has not completed the first to-be-carried task, the control apparatus determines whether the quantity of items stored in the second container carried by the second robot can still satisfy an item requirement of the second workstation after supplying the items to the first workstation. If yes, the second robot may be dispatched to continue to perform the second to-be-carried task. If the second robot has completed the preforming of the first to-be-carried task, the control apparatus determines whether the quantity of items stored in the second container carried by the second robot can satisfy the item requirement of the second workstation. If yes, the second robot may be dispatched to continue to perform the second to-be-carried task.

Step S33: Dispatch the second robot to carry the target second container to the first workstation to complete the first to-be-carried task, and then continue to carry the target second container to the second workstation to complete the second to-be-carried task.

Certainly, the to-be-carried task may alternatively include more tasks, for example, a third to-be-carried task, and a fourth to-be-carried task. Similarly, the control apparatus determines whether the quantity of items stored in the second container can satisfy requirements of the third workstation and the fourth workstation, and if yes, dispatches the second robot to continue to perform the third to-be-carried task and the fourth to-be-carried task until all items in the second container are supplied.

According to the foregoing implementation, to-be-carried tasks of the same target items can be flexibly handled during operation of robots. The cross-workstation transportation implemented by a robot that is working further improves flexibility of robot dispatching and carrying efficiency of the warehousing system.

In some embodiments, when performing the to-be-carried task, the robot may handle only cross-workstation transportation tasks that require the robot to carry containers at another workstation (such as the second workstation) within a specific range of distance from the target workstation (such as the first workstation). If a distance exceeds the distance range, the task is not processed, which makes dispatching simpler and path planning easier. The control apparatus is further configured to perform the following steps.

Step S31': Determine whether the second workstation is located within a preset range around the first workstation.

Step S32': If the second workstation is not located within the preset range around the first workstation, skip performing the step of determining whether the quantity of items stored in the target second container carried by the second robot satisfies a requirement for the quantity of items in the second to-be-carried task after the first to-be-carried task is completed.

In some embodiments, functional areas may be divided for the shelving units. For example, some shelving units are used for storing items with a high warehouse exit frequency, and some shelving units are used for storing items with a low warehouse exit frequency. In this manner, robots may be further dispatched to organize items, making storage positions of the items easier to access. FIG. 6 is a schematic side view of a warehousing system according to an embodiment of this application. As shown in FIG. 6, in some embodiments, a shelving unit includes a first shelving unit 111 and a second shelving unit 112 that are arranged along a height direction. In the height direction, the first shelving unit 111 is adjacent to a first space 12, and the second shelving unit 112 is located on the first shelving unit 111. The first robot includes a high-bay robot 41*a*. The high-bay robot 41*a* is used for accessing a first container 31 placed on the second shelving unit 112. The first container 31 includes a first sub-container used for storing the first-type item with a warehouse exit rate lower than a first threshold.

Among the first robots, robots (for example, the middle- and low-bay robot 41*b* shown in the figure) other than the high-bay robot 41*a* are limited in height, cannot place or take out items on or from the second shelving unit 112, and can place or take out items only on or from the first shelving unit 111. When the high-bay robot 41*a* is configured to perform only an item organization task, because there is no suitable robot to place or take out items on or from the second shelving unit 112 which is high, items that needs to be inbound or outbound cannot be placed on the second shelving unit 112. In this case, as shown in FIG. 7, the control apparatus is also configured to perform the following steps.

Step S41: Determine, from the first container, a first sub-container storing the first-type item with a warehouse exit rate lower than a first threshold.

For example, there are a plurality of first containers placed on the shelving unit, some of the first containers are first sub-containers storing items with a warehouse exit frequency. The first sub-containers are first determined.

Step S42: Determine a first sub-container that does not need to be outbound within preset time, and a first sub-container that needs to be outbound within the preset time.

Step S43: Dispatch the high-bay robot to carry, from the first shelving unit to the second shelving unit, the first sub-container that does not need to be outbound within the preset time, and carry, from the second shelving unit to the first shelving unit, the first sub-container that needs to be outbound within the preset time.

The first sub-container that does not need to be outbound within the preset time may be put onto the second shelving unit by the high-bay robot, to free up the space on the first shelving unit for items with a high warehouse exit frequency, or items with a low warehouse exit frequency but needing to be outbound in a short time. Because the high-bay robot does not participate in performing the to-be-carried task, and the other first robots cannot carry the items on the second shelving unit, the items that need to be inbound or outbound cannot be placed on the second shelving unit. Therefore, if the items stored in the first sub-container need to be outbound, the high-bay robot may be dispatched to carry the first sub-container in advance to the first shelving unit where another first robot can access, so that to-be-carried tasks of the first sub-container can be performed sequentially.

Figure 8:
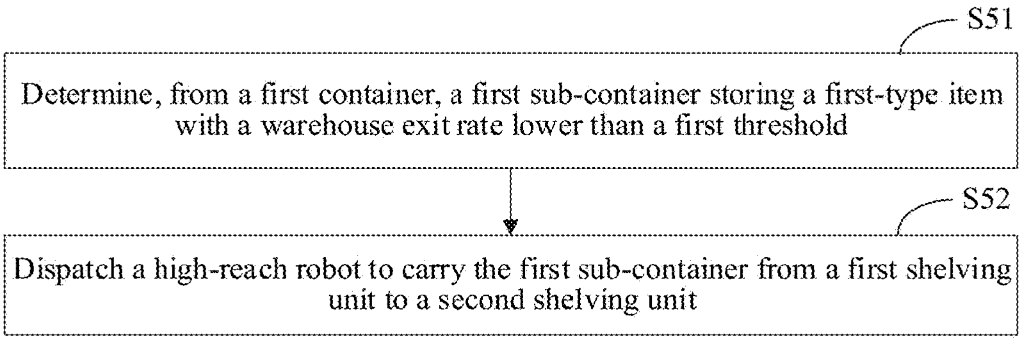
FIG. 8 is a flowchart of a method performed by a control apparatus according to an embodiment of this application.

When the high-bay robot is configured to perform both the to-be-carried task and the item organization task, the high-bay robot may also access items on the second shelving unit at a high level. In this case, as shown in FIG. 8, the control apparatus is further configured to perform the following steps.

Step S51: Determine, from the first container, a first sub-container storing the first-type item with a warehouse exit rate lower than a first threshold.

Step S52: Dispatch the high-bay robot to carry the first sub-container from the first shelving unit to the second shelving unit.

Because the first sub-container has a low warehouse exit frequency, the first sub-container may be placed on the second shelving unit at a high position. At this time, because the high-bay robot participates in performing the to-be-carried task, even if the first sub-container that needs to be outbound is located on the second shelving unit, there is no need to carry the first sub-container to the first shelving unit in advance. The high-bay robot is dispatched to directly perform a to-be-carried task for the first sub-container.

Figure 9:
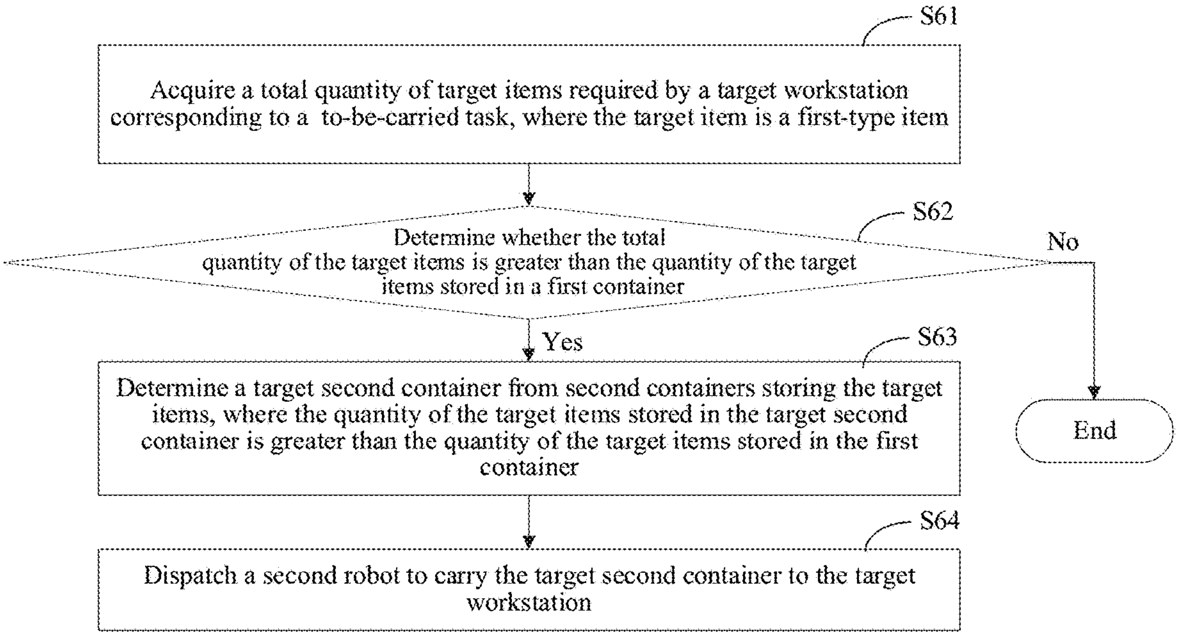
FIG. 9 is a flowchart of a method performed by a control apparatus according to an embodiment of this application.

When the second container is also used for storing the first-type item, if a target workstation needs the first-type item, a container type of a target container may be determined based on the required quantity of first-type items. When the required quantity is large, the second container can be selected, to improve carrying efficiency. In some embodiments, as shown in FIG. 9, the control apparatus is further configured to perform the following steps.

Step S61: Acquire the total quantity of target items required by a target workstation corresponding to the to-be-carried task, where the target item is the first-type item.

Step S62: Determine whether the total quantity of the target items is greater than a preset threshold, and if yes, perform step S63, otherwise, end the process.

The preset threshold may be the quantity of target items stored in the first container. For example, if the total quantity of the target items is M, and the quantity of target items stored in the first container is N, whether M is greater than N is determined.

Step S63: Determine a target second container from the second containers storing the target items, where the quantity of the target items stored in the target second container is greater than the preset threshold.

If M>N, that is, the quantity of items required exceeds the storage quantity of the first container, it is not appropriate to select the first container as the target container. If the first container is selected as the target container, at least two target containers are needed to satisfy a requirement for a to-be-carried task, resulting in low carrying efficiency. In this case, the second container storing a larger quantity of target items is selected as the target container. For example, if identical items are stored on a pallet and in a bin, and the quantity of items stored on the pallet exceeds three boxes, and three boxes of items need to be delivered, carrying needs to be performed three times when a bin is selected, while carrying needs to be performed only once when a pallet is selected, thereby reducing carrying workload and improving carrying efficiency.

It can be understood that even if the quantity of target items stored in the second container is insufficient to satisfy the requirement of the to-be-carried task, selecting the second container as the target container can also reduce the carrying workload. On this basis, another container may be additionally selected as a supplementary target container to complete the to-be-carried task.

Step S64: Dispatch the second robot to carry the target second container to the target workstation.

Figure 10:
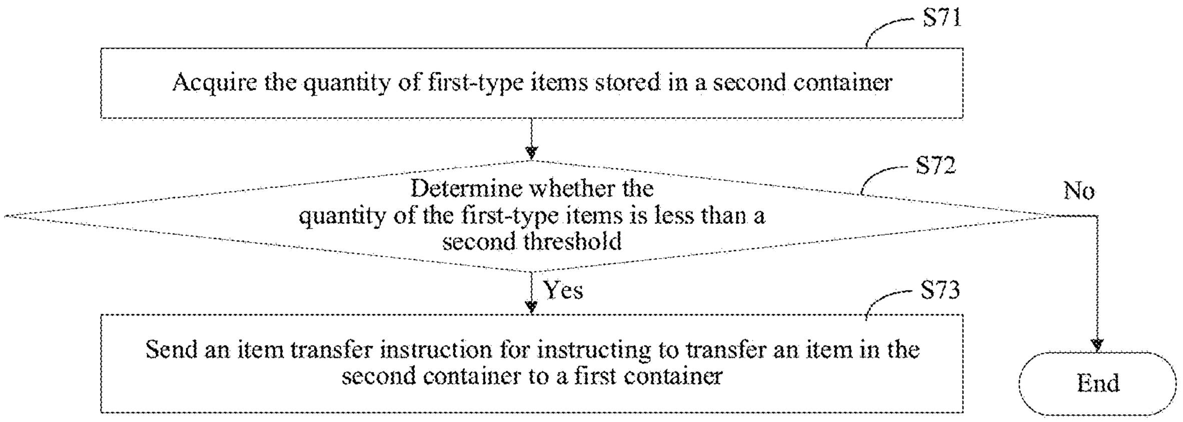
FIG. 10 is a flowchart of a method performed by a control apparatus according to an embodiment of this application.

During the use of the warehousing system, the control apparatus may further dispatch a robot to organize items to improve container utilization and increase storage density. In some embodiments, the second container is further used for storing the first-type item. As shown in FIG. 10, the control apparatus is further configured to perform the following steps.

Step S71: Acquire the quantity of first-type items stored in the second container.

The control apparatus may determine the quantity of remaining items in the second container based on the quantity of items initially accommodated in the second container and an item outbound record relating to the to-be-carried task of the second container. For example, the quantity of items initially accommodated in a specific second container is 100. After several to-be-carried tasks, the total quantity of outbound items is 95, and the quantity of remaining items is 5.

For each second container storing the first-type item, the control apparatus may perform step S71 after each outbound operation of the second container is performed by the warehousing system to acquire the quantity of remaining items, so as to determine whether item transfer is needed in subsequent steps to transfer the items as timely as possible.

Step S72: Determine whether the quantity of the first-type items is less than a second threshold, and if yes, perform step S73, otherwise, end the process.

The second threshold may be set based on warehousing system operation experience, for example, set to a value between 1/10 and 1/5 of the capacity of the second container. When the quantity of remaining items in the second container are less than the threshold, it indicates that there is a small quantity of remaining items in the second container. The items can be transferred out of the second container to empty the second container. Therefore, the second container is in an idle state, and can be used for accommodating a larger quantity of items of another batch, thereby increasing the storage density of the warehousing system.

The second threshold may alternatively be set according to the capacity of the first container. For example, the second threshold is set to the quantity of the first-type item accommodated by the first container. If the quantity of remaining first-type items in the second container is less than the second threshold, it indicates that the remaining items can be accommodated by one first container. Therefore, the remaining items can be transferred to an idle first container, so that the second container is in an idle state and can be used for accommodating a larger quantity of items of another batch. Certainly, the second threshold may alternatively be set to a sum of the capacities of several first containers, such as two, three, or more. For example, the second threshold equals to 3*the capacity of the first container. When the quantity of remaining items in the second container is less than the second threshold, it indicates that the remaining items can be accommodated by three first containers (or a fewer quantity of first containers). At this time, the remaining items can be transferred to one or several first containers that can accommodate these items.

Step S73: Send an item transfer instruction for instructing to transfer an item in the second container to the first container.

After the control apparatus generates and sends the transfer instruction, a user may receive the instruction and perform a transfer operation, or a transfer device (such as a transfer robot or another automation device with a mechanical arm that can achieve a transfer operation function) may receive the instruction to control the transfer device to perform the transfer operation.

The first container is usually determined to be a first container in the idle state, that is, an empty container with no items stored therein. The control apparatus may acquire state information of all containers and select a suitable container as a receiving container from among all first containers that are idle. The first container may be select based on a preset condition. For example, the preset condition is that the first container is closest to the second container of carrying items, or there is an idle transfer device that can perform the transfer operation within the shortest distance around the first container, so that the selection of the first contained facilitates improving efficiency of the transfer operation.

Figure 11:
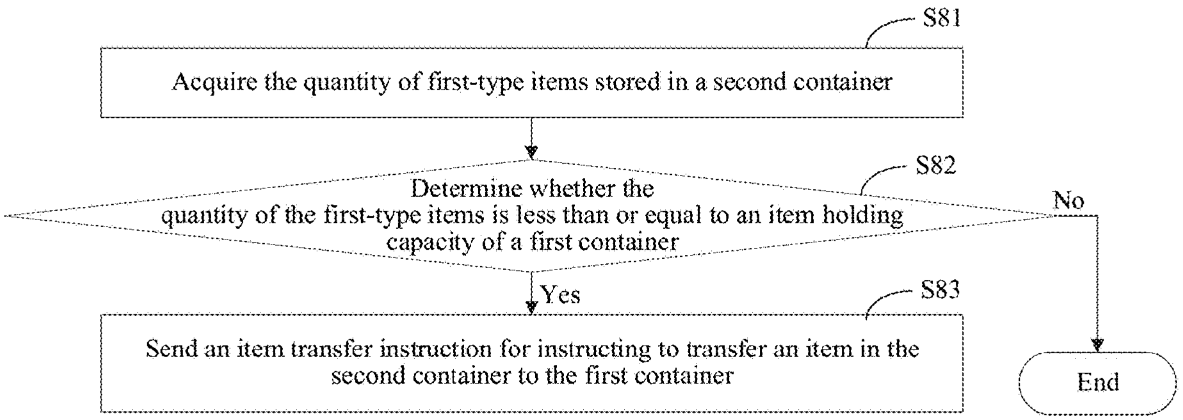
FIG. 11 is a flowchart of a method performed by a control apparatus according to an embodiment of this application.

In another embodiment for implementing item organization, as shown in FIG. 11, the control apparatus is also configured to perform the following steps.

Step S81: Acquire the quantity of first-type items stored in the second container.

Step S82: Determine whether the quantity of the first-type items is less than or equal to an item holding capacity of the first container, and if yes, perform step S83, otherwise, end the process.

Step S83: Send an item transfer instruction for instructing to transfer an item in the second container to the first container.

In this embodiment, whether the items in the second container need to be transferred is determined based on the capacity of the first container. If the quantity of remaining items in the second container can be accommodated by one first container, the items are transferred to the idle first container.

In another embodiment for implementing item organization, the methods of the foregoing two embodiments may also be combined. If the quantity of first-type items is less than a second threshold, or the quantity of the first-type items is less than or equal to an item holding capacity of the first container, item transfer is performed. In other words, as long as one of the foregoing two conditions is satisfied, the transfer operation can be performed. In this way, items can be organized in a timely manner, and the second container with a small quantity of remaining items can be emptied in a timely manner to improve container utilization.

Figure 12:
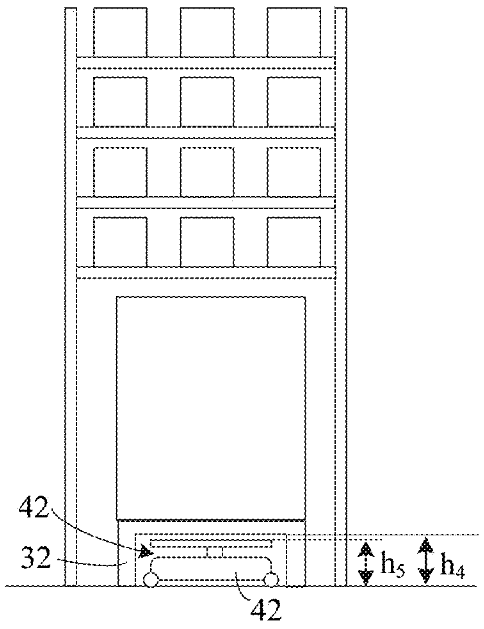
FIG. 12 is a side view of a second robot passing through a bottom of a second container according to an embodiment of this application.

FIG. 12 is a side view of a second robot passing through a bottom of a second container according to an embodiment of this application. As shown in FIG. 12, a second space 13 is formed at a bottom of the second container 32, and a height $h_4$ of the second space 13 is higher than a height $h_5$ of the second robot 42, so that the second robot 42 can pass through the second space 13. The control apparatus is further configured to perform the following steps.

Step S91: In response to the second container being not loaded on the second robot, dispatch the second robot to pass through the second space.

Figure 13:
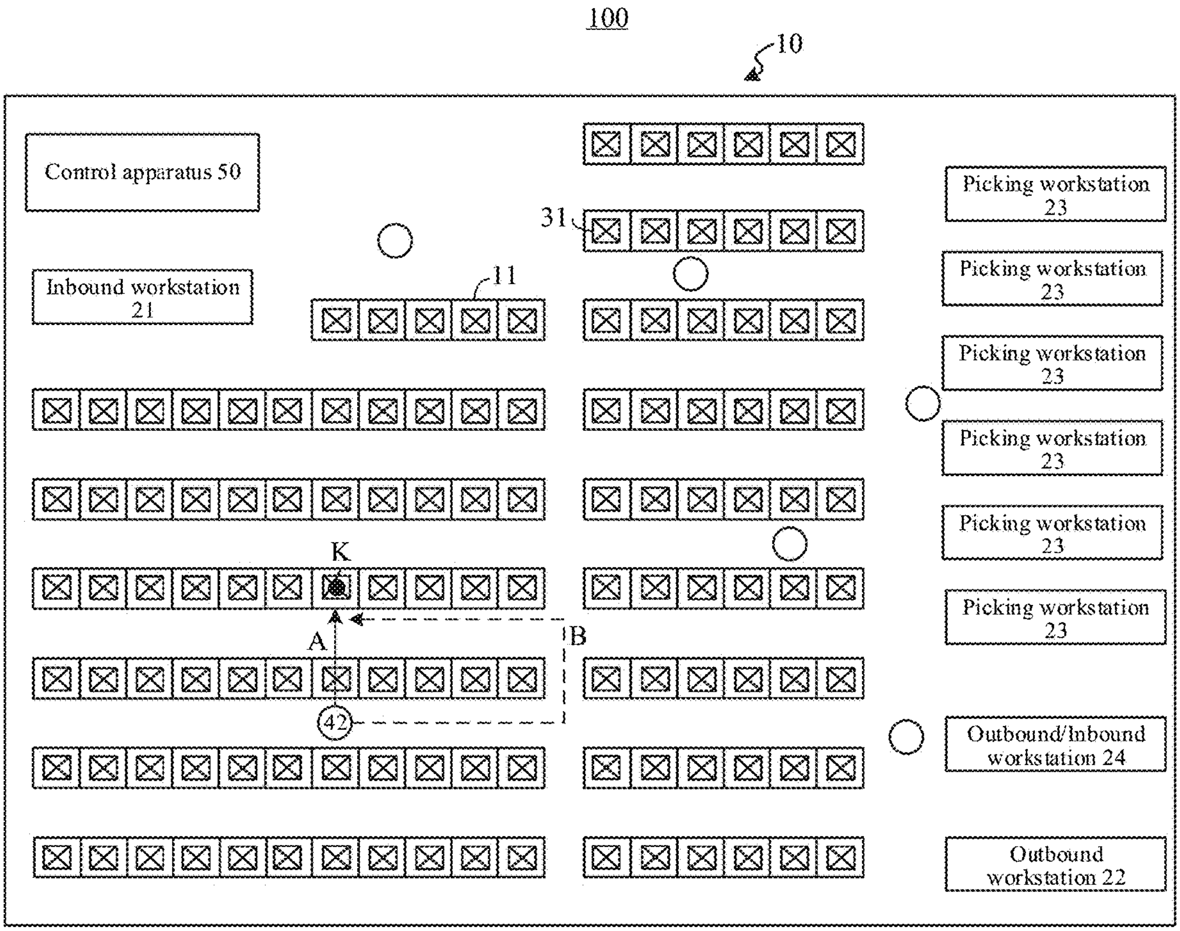
FIG. 13 is a schematic planar diagram of path comparison according to an embodiment of this application.

An item loading state of a robot includes an unloaded state and a loaded state. The control apparatus determines whether the second container is loaded on the second robot by acquiring an item loading state of the second robot. The second robot without loading the second container may pass through the second space. When the control apparatus is planning a path for the second robot, if the second robot passes through the second space under a specific shelving unit, and the path is shorter than passing through passages provided between the shelving units, between the shelving units and the workstations, and/or between the workstations, or other robots on the passage may be avoided, the path passing through the second space may be selected, to improve movement efficiency and carrying efficiency of the robots. FIG. 13 is a planar schematic diagram of path comparison according to an embodiment of this application. As shown in FIG. 13, a path along which the second robot 42 (where for convenience of description, labels of other robots have been deleted) passes through a passage is path A, a path along which the second robot 42 passes through the second space 13 is path B, and path B is shorter than path A. In addition, when there are other robots on the section of path A that is bypassed when selecting path B, there is no need to consider obstacle avoidance when path B is selected.

Certainly, similar to the foregoing solution, the control apparatus may also dispatch the second robot in the unloaded state to pass through the first space in which the second container is not placed, or dispatch the second robot in the loaded state to pass through the first space in which the second container is not placed.

In some embodiments, the quantity of first spaces 12 may not be fixed, but may be dynamically adjusted based on a storage space requirement. For example, if the second-type item to be stored increases, the first space 12 needs to be added, that is, the first space 12 is provided at the bottoms of more shelving units 11. The control apparatus is further configured to perform the following steps.

determining a dynamic adjustment plan for the first space based on an item storage requirement, where the dynamic adjustment plan includes providing the first space at a bottom of a first shelving unit which is not provided with the first space and canceling the first space at a bottom of a second shelving unit which is provided with the first space.

The first space can be adjusted through a structure design of a shelving unit and matching shelves. For example, the first space is reserved at the bottom of the shelving unit during the structure design; a shelf is added under the shelving unit that may be used for storing the first container; accordingly, only the shelf needs to be removed, the first space can be re-formed.

By using the foregoing method, the quantity of first spaces can be flexibly adjusted based on actual requirement, improving the storage space utilization of the warehousing system. It is especially suitable for situations in which the quantity of special-shaped items changes greatly but the quantity of special-shaped items is not large. The first space can be added based on an actual requirement, or the first space used for storing the second container into a first subspace that can store the first container. In this way, the first space (used for placing the second container) and the first subspace (used for placing the first container) may be converted to each other. To be specific, storage positions of the foregoing two containers at the bottom of the shelving unit can be converted to each other.

Embodiments of this application further provides a control method of the warehousing system. Refer to FIG. 3. The method includes the following steps:

- determining a container type of a target container corresponding to a to-be-carried task, where the container type is a first container or a second container, the first container is used for storing a first-type item, the first-type item is an item with an attribute satisfying a preset standard, the second container is at least used for storing a second-type item, and the second-type item is an item with an attribute not satisfying the preset standard;
- determining a position for storing the target container, where the position includes a shelving unit located in a storage area or a first space located at a bottom of the shelving unit, the first space is provided under at least a part of the shelving units, the shelving unit is used for placing the first container, and the first space is used for placing the second container;
- determining, based on the container type, a target robot used for carrying the target container, where the target robot is a first robot or a second robot, the first robot is used for placing or taking out the first container on or from the shelving unit, and the second robot is used for placing or taking out the second container in or from the first space; and
- dispatching the target robot to place or take out the target container at or from the position to perform the to-be-carried task, and
- if a same order includes both the first-type item and the second-type item, controlling the first robot and the second robot that perform to-be-carried tasks corresponding to the same order to carry the first-type item and the second-type item respectively to a same workstation, or controlling the first robot to place the first container storing the first-type item on the second container, and controlling the second robot to carry the first-type item and the second-type item to a same workstation.

The method of this embodiment further includes the steps of various method embodiments performed by the control apparatus in the foregoing warehousing system embodiment. Reference may be made to the previous description. Details are not described herein again.

Figure 14:
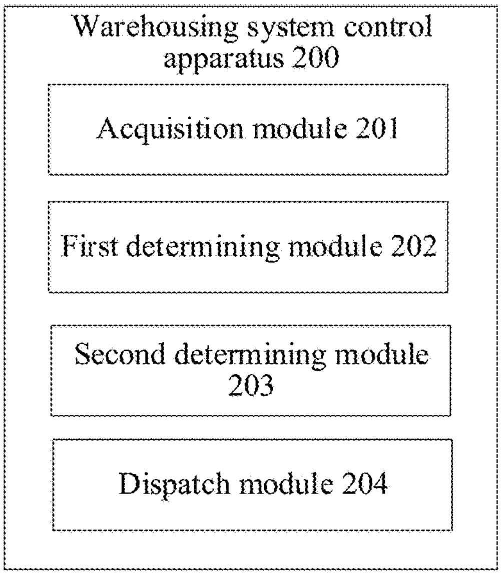
FIG. 14 is a schematic diagram of a structure of a warehousing system control apparatus according to an embodiment of this application.

FIG. 14 is a schematic diagram of a structure of a warehousing system control apparatus according to an embodiment of this application. As shown in FIG. 14, the apparatus 200 includes:

- an acquisition module 201, configured to determine a container type of a target container corresponding to a to-be-carried task, where the container type includes a first container and a second container, the first container is used for storing a first-type item, the first-type item is an item with an attribute satisfying a preset standard, the second container is at least used for storing a second-type item, and the second-type item is an item with an attribute not satisfying the preset standard;

a first determining module 202, configured to determine a position for storing the target container, where the position includes a shelving unit located in a storage area or a first space located at a bottom of the shelving unit, the first space is provided under at least a part of the shelving units, the shelving unit is used for placing the first container, and the first space is used for placing the second container;

a second determining module 203, configured to determine, based on the container type, a target robot used for carrying the target container, where the target robot is a first robot or a second robot, the first robot is used for placing or taking out the first container on or from the shelving unit, and the second robot is used for placing or taking out the second container in or from the first space; and a dispatch module 204, configured to dispatch the target robot to place or take out the target container at or from the position to perform the to-be-carried task, and if a same order includes both the first-type item and the second-type item, control the first robot and the second robot that perform to-be-carried tasks corresponding to the same order to carry the first-type item and the second-type item respectively to a same workstation, or control the first robot to place the first container storing the first-type item on the second container, and control the second robot to carry the first-type item and the second-type item to a same workstation.

The warehousing system control apparatus provided in this embodiment is configured to perform the technical solution of the warehousing system control method in the foregoing method embodiments. Their implementation principles and technical effects are similar. Details are not described herein again.

Figure 15:
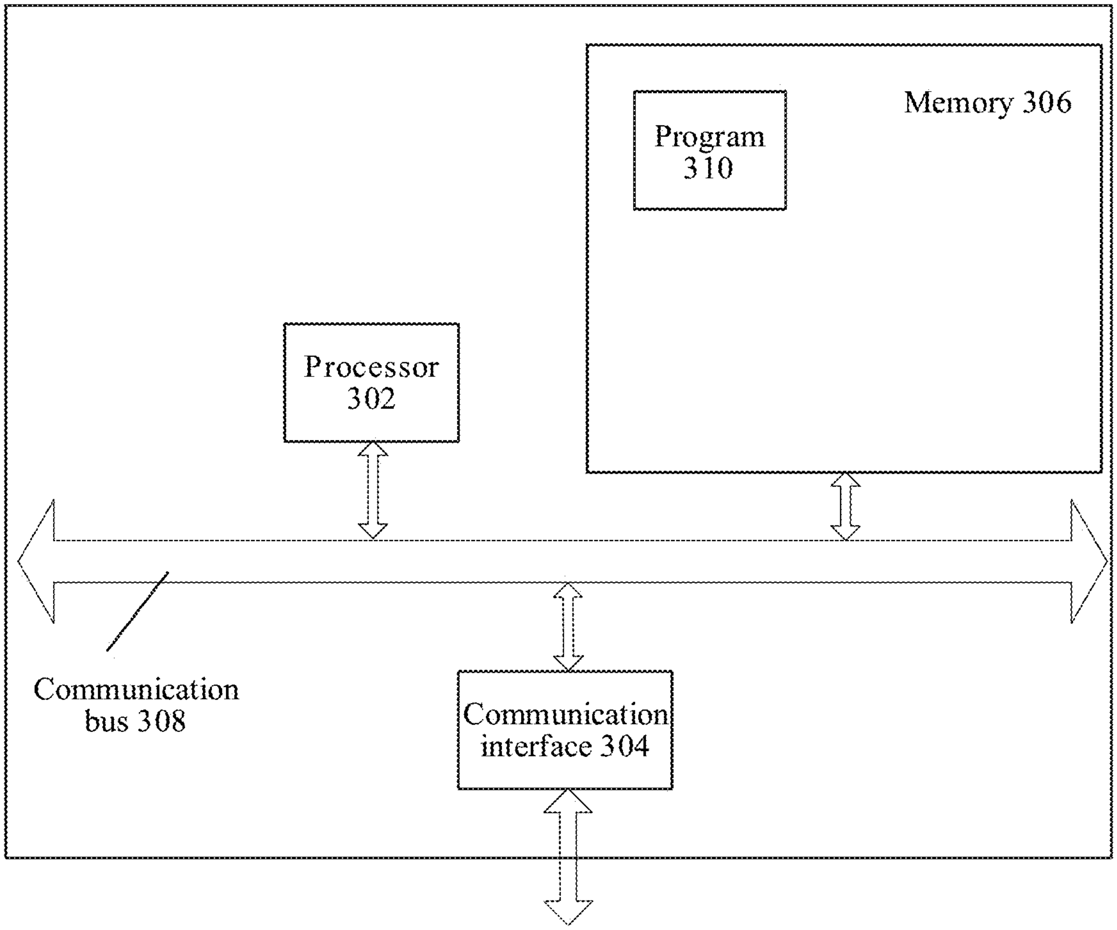
FIG. 15 is a schematic diagram of a structure of an electronic device according to an embodiment of this application.

FIG. 15 is a schematic diagram of a structure of an electronic device according to an embodiment of this application. The specific implementation of the electronic device is not limited in specific embodiments of this application. As shown in FIG. 15, the electronic device may include a processor (processor) 302, a communication interface (Communication Interface) 304, a memory (memory) 306, and a communication bus 308.

The processor 302, the communication interface 304, and the memory 306 complete communication with each other via the communication bus 308. The communication interface 304 is configured to communicate with network elements of other devices such as clients or other servers. The processor 302 is configured to execute a program 310, specifically, may perform related steps of the foregoing warehousing system control method embodiment.

Specifically, the program 310 may include program code. The program code includes a computer operation instruction.

The processor 302 may be a CPU, an application-specific integrated circuit (Application-Specific Integrated Circuit) ASIC, or one or more integrated circuits configured to implement embodiments of the present invention. The one or more processors included in the electronic device may be the same type of processors, such as one or more CPUs; or they may be different types of processors, such as one or more CPUs and one or more ASICs.

The memory 306 is configured to store the program 310. The memory 306 may include a high-speed RAM, or may further include a non-volatile memory (non-volatile memory), for example, at least one magnetic disk storage.

Embodiments of this application provide a computer-readable storage medium. The storage medium stores at least one executable instruction. When the executable instruction is run on an electronic device, the electronic device is enabled to perform the operations of the warehousing system control method in the foregoing embodiments.

Embodiments of this application provide a computer program product, including a computer program. The computer program, when executed by a processor, performs the operations of the warehousing system control method in the foregoing embodiments.

Embodiments of this application provide a computer program. The computer program may be called by a processor to cause an electronic device to perform the warehousing system control method in any of the foregoing method embodiments.

The algorithms or displays provided herein are not inherently associated with any particular computer, virtual system, or other device. Various general-purpose systems may also be used together with the teaching herein. From the foregoing description, a structure required to construct such a system is clear. In addition, embodiments of this application are not targeted at any specific programming language. It should be understood that content of this application described herein may be implemented by using a variety of programming languages, and that the foregoing descriptions of specific languages are for the purpose of disclosing the optimal implementation of this application.

Numerous specific details are set forth in the specification provided herein. However, it can be understood that embodiments of this application may be practiced without the specific details. In some examples, known methods, structures, and technologies are not disclosed in detail, so as not to mix up understanding on the specification.

Similarly, it should be understood that to simplify this application and help to understand one or more of disclosure aspects, in the descriptions of the exemplary embodiments of this application, features of embodiments of this application are sometimes grouped into a single embodiment or figure, or descriptions thereof. However, the methods in the present disclosure should not be construed as reflecting the following intention: that is, this application claimed to be protected is required to have more features than those clearly set forth in each claim.

A person skilled in the art may understand that modules in devices in an embodiment may be adaptively changed and arranged in one or more devices different from this embodiment. The modules or units or components in embodiments may be combined into one module or unit or component, and the modules or units or components may be divided into a plurality of sub-modules or sub-units or sub-components. All features disclosed in this specification (including the accompanying claims, abstract and drawings), and all processes or units of any method or device disclosed herein may be combined in any combination, unless at least some of such features and/or processes or units are mutually exclusive. Unless otherwise explicitly stated, each feature disclosed in this specification (including the accompanying claims, abstract and drawings) may be replaced with an alternative feature serving the same, equivalent or similar purpose.

It should be noted that the foregoing embodiments illustrate rather than limit this application, and a person skilled in the art may devise alternative embodiments without departing from the scope of the appended claims. In the claims, any reference signs placed between parentheses shall not be construed as limiting the claims. The term "comprising or including" does not exclude the presence of elements or steps not listed in a claim. The word "a" or "an" preceding an element does not exclude the presence of a plurality of such elements. This application can be implemented by way of hardware including several different elements and an appropriately programmed computer. In the unit claims enumerating several apparatuses, several of these apparatuses can be specifically embodied by the same item of hardware. The use of the words such as "first", "second", "third", and the like does not denote any order. These words can be interpreted as names. Unless otherwise specified, the steps in the foregoing embodiments should not be understood as limiting the order of execution.

The invention claimed is:

1. A warehousing system control method, comprising:

determining a container type of a target container corresponding to a to-be-carried task, where the container type is a first container or a second container, the first container is used for storing a first-type item, the first-type item is an item with an attribute satisfying a preset standard, the second container is at least used for storing a second-type item, and the second-type item is an item with an attribute not satisfying the preset standard;

determining a position for storing the target container, wherein the position comprises a shelving unit located in a storage area or a first space located at a bottom of the shelving unit, the first space is provided under at least a part of the shelving units, the shelving unit is used for placing the first container, and the first space is used for placing the second container;

determining, based on the container type, a target robot used for carrying the target container, wherein the target robot is a first robot or a second robot, the first robot is used for placing or taking out the first container on or from the shelving unit, and the second robot is used for placing or taking out the second container in or from the first space; and dispatching the target robot to place or take out the target container at or from the position to perform the to-be-carried task, and if a same order comprises both the first-type item and the second-type item, controlling the first robot to place the first container storing the first-type item on the second container, and controlling the second robot to carry the first-type item and the second-type item to a same workstation.

2. The warehousing system control method according to claim 1, wherein the method further comprises:

receiving at least two to-be-carried tasks, wherein the at least two to-be-carried tasks are to respectively carry at least two target items to at least two workstations;

determining, from the second containers storing the target items, a target second container that satisfies a requirement of at least a part of workstations for the target items;

determining a target position for storing the target second container; and dispatching the second robot to carry the target second container from the target position to the part of the at least two workstations in sequence.

3. The warehousing system control method according to claim 2, wherein the determining, from the second containers storing the target items, a target second container that satisfies a requirement of at least a part of workstations for the target items comprises:

acquiring the total quantity of target items of the at least two to-be-carried tasks; and determining, from the second containers storing the target items, the target second container in which the quantity of the target items is closest to and greater than or equal to the total quantity of the target items.

4. The warehousing system control method according to claim 1, wherein the method further comprises:

in response to receipt of a first to-be-carried task, dispatching the second robot to perform the first to-be-carried task, wherein the first to-be-carried task is to carry a target item to a first workstation, and the target item is stored in a target second container;

in response to receipt of a second to-be-carried task that is to carry the target item to a second workstation, determining whether the quantity of items stored in the target second container carried by the second robot satisfies a requirement for the quantity of items in the second to-be-carried task after the first to-be-carried task is completed; and if the quantity of items stored in the target second container carried by the second robot satisfies a requirement for the quantity of items in the second to-be-carried task after the first to-be-carried task is completed, dispatching the second robot to carry the target second container to the first workstation to complete the first skipping performing task, and then continue to carry the target second container to the second workstation to complete the second skipping performing task.

5. The warehousing system control method according to claim 4, wherein the method further comprises:

determining whether the second workstation is located within a preset range around the first workstation; and if the second workstation is not located within the preset range around the first workstation, skipping performing the step of determining whether the quantity of items stored in the target second container carried by the second robot satisfies a requirement for the quantity of items in the second to-be-carried task after the first to-be-carried task is completed.

6. The warehousing system control method according to claim 1, wherein the shelving unit comprises a first shelving unit and a second shelving unit that are arranged along a height direction, in the height direction, the first shelving unit is adjacent to the first space, the second shelving unit is located on the first shelving unit, the first robot comprises a high-bay robot, and the high-bay robot is used for accessing the first container placed on the second shelving unit; and the method further comprises:

determining, from the first container, a first sub-container storing the first-type item with a warehouse exit rate lower than a first threshold;

determining a first sub-container that does not need to be outbound within preset time, and a first sub-container that needs to be outbound within the preset time; and dispatching the high-bay robot to carry, from the first shelving unit to the second shelving unit, the first sub-container that does not need to be outbound within the preset time, and carry, from the second shelving unit to the first shelving unit, the first sub-container that needs to be outbound within the preset time.

7. The warehousing system control method according to claim 1, wherein the second container is further used for storing the first-type item; and the method further comprises:

acquiring the total quantity of target items required by a target workstation corresponding to the to-be-carried task, wherein the target item is the first-type item;

determining whether the total quantity of the target items is greater than a preset threshold;

if the total quantity of the target items is greater than a preset threshold, determining a target second container from the second containers storing the target items, wherein the quantity of the target items stored in the target second container is greater than the preset threshold; and dispatching the second robot to carry the target second container to the target workstation.

8. The warehousing system control method according to claim 1, wherein the second container is further used for storing the first-type item; and the method further comprises:

acquiring the quantity of first-type items stored in the second container; and determining whether the quantity of the first-type items is less than a second threshold, and if the quantity of the first-type items is less than a second threshold, sending an item transfer instruction for instructing to transfer an item in the second container to the first container; and/or determining whether the quantity of the first-type items is less than or equal to an item holding capacity of the first container, and if the quantity of the first-type items is less than or equal to an item holding capacity of the first container, sending an item transfer instruction for instructing to transfer an item in the second container to the first container.

9. The warehousing system control method according to claim 1, wherein a second space is formed at a bottom of the second container, and a height of the second space is higher than a height of the second robot; and the method further comprises:

in response to the second container being not loaded on the second robot, dispatching the second robot to pass through the second space.

10. An electronic device, comprising a processor, a memory, a communication interface, and a communication bus, wherein the processor, the memory, and the communication interface communicate with each other via the communication bus; and the memory is configured to store at least one executable instruction, and the executable instruction enables the processor to perform operations of the warehousing system control method according to claim 1.

11. A non-transitory computer-readable storage medium, wherein the storage medium stores at least one executable instruction, and when the executable instruction is run on an electronic device, the electronic device is enabled to perform operations of the warehousing system control method according to claim 1.

12. A warehousing system, comprising a storage area, wherein a plurality of shelving units are provided in the storage area, the shelving unit is used for placing a first container, the first container is used for storing a first-type item, and the first-type item is an item with an attribute satisfying a preset standard;

a first space is formed at a bottom of at least a part of the shelving units, the first space is used for placing a second container, the second container is at least used for storing a second-type item, and the second-type item is an item with an attribute not satisfying the preset standard; and a first robot and a second robot are further provided in the storage area, the first robot is used for placing or taking out the first container on or from the shelving unit, and the second robot is used for placing or taking out the second container in or from the first space; and the warehousing system further comprises a control apparatus, and the control apparatus is configured to:

determine a container type of a target container corresponding to a to-be-carried task, wherein the container type is the first container or the second container;

determine a position for storing the target container;

determine, based on the container type, a target robot used for carrying the target container, wherein the target robot is the first robot or the second robot; and dispatch the target robot to place or take out the target container at or from the position to perform the to-be-carried task, and if a same order comprises both the first-type item and the second-type item, control the first robot to place the first container storing the first-type item on the second container, and control the second robot to carry the first-type item and the second-type item to a same workstation.

13. The warehousing system according to claim 12 wherein the warehousing system further comprises a plurality of workstations; and the control apparatus is further configured to:

receive at least two to-be-carried tasks, wherein the at least two to-be-carried tasks are to respectively carry at least two target items to at least two workstations;

determine, from the second containers storing the target items, a target second container that satisfies a requirement of at least a part of workstations for the target items;

determine a target position for storing the target second container; and dispatch the second robot to carry the target second container from the target position to the part of the at least two workstations in sequence.

14. The warehousing system according to claim 13, wherein the control apparatus being configured to determine, from the second containers storing the target items, a target second container that satisfies a requirement of at least a part of workstations for the target items comprises:

acquiring the total quantity of target items of the at least two to-be-carried tasks; and determining, from the second containers storing the target items, the target second container in which the quantity of the target items is closest to and greater than or equal to the total quantity of the target items.

15. The warehousing system according to claim 12, wherein the warehousing system comprises at least a first workstation and a second workstation; and the control apparatus is further configured to:

in response to receipt of a first to-be-carried task, dispatch the second robot to perform the first to-be-carried task, wherein the first to-be-carried task is to carry a target item to the first workstation, and the target item is stored in a target second container;

in response to receipt of a second to-be-carried task that is to carry the target item to the second workstation, determine whether the quantity of items stored in the target second container carried by the second robot satisfies a requirement for the quantity of items in the second to-be-carried task after the first to-be-carried task is completed; and if the quantity of items stored in the target second container carried by the second robot satisfies a requirement for the quantity of items in the second to-be-carried task after the first to-be-carried task is completed, dispatch the second robot to carry the target second container to the first workstation to complete the first to-be-carried task, and then continue to carry the target second container to the second workstation to complete the second to-be-carried task.

16. The warehousing system according to claim 15, wherein the control apparatus is further configured to:

determine whether the second workstation is located within a preset range around the first workstation; and if the second workstation is not located within the preset range around the first workstation, skip performing the step of determining whether the quantity of items stored in the target second container carried by the second robot satisfies a requirement for the quantity of items in the second to-be-carried task after the first to-be-carried task is completed.

17. The warehousing system according to claim 12, wherein the shelving unit comprises a first shelving unit and a second shelving unit that are arranged along a height direction, in the height direction, the first shelving unit is adjacent to the first space, the second shelving unit is located on the first shelving unit;

the first container comprises a first sub-container used for storing the first-type item with a warehouse exit rate lower than a first threshold;

the first robot comprises a high-bay robot, and the high-bay robot is used for accessing the first container placed on the second shelving unit; and the control apparatus is further configured to:

determine, from the first container, a first sub-container storing the first-type item with a warehouse exit rate lower than a first threshold;

determine a first sub-container that does not need to be outbound within preset time, and a first sub-container that needs to be outbound within the preset time; and dispatch the high-bay robot to carry, from the first shelving unit to the second shelving unit, the first sub-container that does not need to be outbound within the preset time, and carry, from the second shelving unit to the first shelving unit, the first sub-container that needs to be outbound within the preset time.

18. The warehousing system according to claim 12, wherein the warehousing system further comprises a plurality of workstations, and the second container is further used for storing the first-type item; and the control apparatus is further configured to:

acquire the total quantity of target items required by a target workstation corresponding to the to-be-carried task, wherein the target item is the first-type item;

determine whether the total quantity of the target items is greater than a preset threshold;

if the total quantity of the target items is greater than a preset threshold, determine a target second container from the second containers storing the target items, wherein the quantity of the target items stored in the target second container is greater than the preset threshold; and dispatch the second robot to carry the target second container to the target workstation.

19. The warehousing system according to claim 12, wherein the second container is further used for storing the first-type item; and the control apparatus is further configured to:

acquire the quantity of first-type items stored in the second container; and determine whether the quantity of the first-type items is less than a second threshold, and if the quantity of the first-type items is less than a second threshold, send an item transfer instruction for instructing to transfer an item in the second container to the first container; and/or determine whether the quantity of the first-type items is less than or equal to an item holding capacity of the first container, and if the quantity of the first-type items is less than or equal to an item holding capacity of the first container, send an item transfer instruction for instructing to transfer an item in the second container to the first container.

20. The warehousing system according to claim 12, wherein a second space is formed at a bottom of the second container, and a height of the second space is higher than a height of the second robot; and the control apparatus is further configured to:

in response to the second container being not loaded on the second robot, dispatch the second robot to pass through the second space.

* * * * *